US012735542B2

(12) United States Patent
Watari et al.

(10) Patent No.: US 12,735,542 B2
(45) Date of Patent: Sep. 15, 2026

(54) PREPREG

(71) Applicant: TORAY INDUSTRIES, INC., Tokyo (JP)

(72) Inventors: Ryohei Watari, Nagoya (JP); Takashi Ochi, Iyo-gun (JP); Yoshikazu Kono, Iyo-gun (JP); Atsuki Sugimoto, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 224 days.

(21) Appl. No.: 18/281,603

(22) PCT Filed: Apr. 25, 2022

(86) PCT No.: PCT/JP2022/018694
§ 371 (c)(1),
(2) Date: Sep. 12, 2023

(87) PCT Pub. No.: WO2022/230800
PCT Pub. Date: Nov. 3, 2022

(65) Prior Publication Data

US 2024/0158592 A1 May 16, 2024

(30) Foreign Application Priority Data

Apr. 26, 2021 (JP) ................................ 2021-073874

(51) Int. Cl.
*C08J 5/24* (2006.01)
*C08J 5/18* (2006.01)

(52) U.S. Cl.
CPC ................ *C08J 5/243* (2021.05); *C08J 5/18* (2013.01); *C08J 2300/22* (2013.01); *C08J 2363/00* (2013.01)

(58) Field of Classification Search
CPC ..... C08J 5/243; C08J 5/249; C08J 5/18; C08J 2300/22; C08J 2463/00; C08J 2477/00; Y02T 50/40
USPC ...................................................... 428/297.4
See application file for complete search history.

(56) References Cited

U.S. PATENT DOCUMENTS

2006/0090856 A1 5/2006 Nelson et al.
2012/0088864 A1 4/2012 Wang
2013/0217283 A1 8/2013 Arai et al.
2016/0122528 A1* 5/2016 Kobayashi .............. C08J 5/042 523/468
2016/0271860 A1 9/2016 Mashima et al.
2018/0312648 A1 11/2018 Mitsutsuji et al.
2019/0352474 A1 11/2019 Fuse et al.
2021/0108041 A1 4/2021 Okuda et al.
2021/0122892 A1 4/2021 Kobayashi et al.
2021/0363316 A1 11/2021 Kobayashi et al.

FOREIGN PATENT DOCUMENTS

EP 2 412 742 A1 2/2012
EP 3 093 308 B1 4/2019
JP 2000-309021 A 11/2000
JP 2001-139662 A 5/2001
JP 2012-154000 A 8/2012
JP 2016-185704 A 10/2016
JP 2018-172487 A 11/2018
JP 2020-169424 A 10/2020
WO WO 2017/073483 A1 5/2017
WO WO 2018/143067 A1 8/2018
WO WO 2019/203088 A1 10/2019
WO WO 2020/003662 A1 1/2020
WO WO 2020/004421 A1 1/2020

OTHER PUBLICATIONS

Toray T700 S Carbon Fiber Data Sheet, accessed online Jul. 25, 2025 (Year: 2025).*
Extended European Search Report for European Application No. 22795713.1, dated Nov. 27, 2024.
International Search Report, issued in PCT/JP2022/018694, PCT/ISA/210, dated Jun. 21, 2022.
Written Opinion of the International Searching Authority, issued in PCT/JP2022/018694, PCT/ISA/237, dated Jun. 21, 2022.

* cited by examiner

*Primary Examiner* — Camie S Thompson
(74) *Attorney, Agent, or Firm* — Birch, Stewart, Kolasch & Birch, LLP

(57) ABSTRACT

A prepreg containing at least the following components [A] to [D], wherein the prepreg includes: a first layer in which the component [A] is impregnated with a first resin composition containing the components [B] and [C]; and a second layer that contains a second resin composition containing the components [B] to [D] and is formed on both surfaces of the first layer, and the first layer and the second layer are adjacent to each other, an average fiber diameter of a carbon fiber as the component [A] is 6 μm or more and 9 μm or less, and a content of a bifunctional amine type epoxy resin [B1] is 15 parts by mass or more and less than 40 parts by mass based on 100 parts by mass of a total amount of epoxy resin of the component [B]: [A] a carbon fiber; [B] an epoxy resin; [C] a curing agent; and [D] thermoplastic resin particles. The present invention provides a prepreg that is excellent in tensile strength, heat resistance, and impact resistance, and provides a carbon fiber composite material suitable as a structural material of an aircraft body, and is further excellent in impregnating property in the production of the prepreg and conveyance property of the prepreg in an automated lay-up device.

10 Claims, No Drawings

PREPREG

TECHNICAL FIELD

The present invention relates to a prepreg for producing a carbon fiber composite material.

BACKGROUND ART

Heretofore, fiber reinforced composite materials, which contain reinforcing fibers and a matrix resin, are light in weight, yet superior in mechanical properties such as strength and stiffness, heat resistance, and corrosion resistance. Therefore, fiber reinforced composite materials have been applied to many fields, such as aerospace, cars, railway vehicles, ships, civil engineering and construction, and sports goods. In particular, in applications where high heat resistance performance is required, fiber reinforced composite materials using continuous reinforcing fibers are used. In particular, a method of using a prepreg which is a sheet-shaped intermediate base material obtained by impregnating reinforcing fibers with an uncured thermosetting resin composition is common. In this method, a molded article of a fiber reinforced composite material is obtained by laminating prepregs and then curing the thermosetting resin composition by heating. As the reinforcing fibers, carbon fibers excellent in specific strength and specific elastic modulus are preferably used. As the matrix resin, thermosetting resins, in particular, epoxy resins having high adhesiveness to carbon fibers, high heat resistance, high elastic modulus, and small curing shrinkage are often used. In recent years, carbon fiber reinforced composite materials, which (hereinafter, abbreviated as CFRP) have high specific strength and specific stiffness, have attracted attention particularly as structural materials for aircraft that require weight reduction.

Examples of the method of laminating prepregs include a Hand Lay-up method, an Automated Tape Layup (ATL) method, and an Automated Fiber Placement (AFP) method, and the like. In the case of producing a large-sized composite material such as aircraft, automated lay-up methods such as an ATL method or an AFP method, which is more excellent in productivity than the Hand Lay-up method, are used (see, for example, Patent Document 1). Among them, the AFP method is a method of laminating slit tape prepregs (hereinafter, simply referred to as a slit tape) obtained by cutting a prepreg into a tape shape in the fiber direction. This method is suitable for producing parts having relatively many curved surfaces such as an aircraft fuselage, provides good yield of materials, and thus has become a method that has been often used in recent years.

In the AFP method, in order to improve the lamination efficiency, about ten to several tens of narrow slit tapes having a width of 3 to 13 mm are passed through guide rolls, gathered on a machine head, and laminated on a base material. At this time, the resin adheres to the guide roll due to abrasion between the guide roll and the slit tape, and non-impregnated fibers included in the slit tape subsequently passing through the guide roll adhere to the resin adhered to the guide roll and are pulled. This causes a problem that the processability of the slit tape in the subsequent processes is deteriorated.

In order to prevent the non-impregnated fibers in the slit tape from adhering to the resin attached to the guide roll and being pulled, it is necessary to reduce the non-impregnated fibers included in the slit tape. For this purpose, an approach is considered in which the viscoelasticity of the matrix resin is adjusted to improve the impregnating property into carbon fibers. In order to improve the impregnating property, a method of frequently using a liquid epoxy resin to reduce the viscosity of the matrix resin is considered.

Structural materials for aircraft are required to have improved material strength and stable durability. Therefore, a liquid polyfunctional aromatic epoxy resin capable of providing a cured resin having a high crosslinking density has been suitably used for such structural materials. However, when the liquid polyfunctional aromatic epoxy resin is frequently used, a resin having a high elastic modulus and high heat resistance can be designed, but a cured resin having a small deformability and low toughness tends to be obtained.

In light of this, some attempts to employ a method of blending a rubber component or a thermoplastic resin having excellent toughness and forming a phase-separated structure with an epoxy resin have been made (for example, Patent Document 2, and the like). Patent Document 3 has also studied a method of blending a large amount of a thermoplastic resin having a small molecular weight to improve the toughness while reducing the viscosity.

In Patent Document 4, the impregnating property of the matrix resin is improved by improving the spreading property of the carbon fiber bundle in the preparation of the prepreg.

PRIOR ART DOCUMENT

Patent Documents

Patent Document 1: Published Japanese Translation No. 2008-517810 of the PCT International Publication Patent Document 2: Japanese Patent Laid-open Publication No. 2001-139662

Patent Document 3: International Publication 2012/051045

Patent Document 4: Japanese Patent Laid-open Publication No. 2000-309021

SUMMARY OF THE INVENTION

Problems to be Solved by the Invention

In the method described in Patent Document 2, since the viscosity of the resin is high, there is a problem in the impregnating property of the resin into the carbon fibers in the preparation of the prepreg. In addition, the method described in Patent Document 3 has a problem that the viscosity of the matrix resin cannot be sufficiently reduced. The method described in Patent Document 4 substantially targets a prepreg having a carbon fiber basis weight of 35 $g/m^2$ or less, and is a technique unsuitable for use in a prepreg for aircraft application.

In view of such background art, an object of the present invention is to provide a prepreg that provides a carbon fiber composite material excellent in tensile strength, heat resistance, and impact resistance, the prepreg being excellent in impregnating property in the production of the prepreg and the conveyance property of the prepreg in an automated lay-up device.

Solutions to the Problems

The present invention adopts the following means in order to solve the problems. That is, the present invention is a prepreg containing at least the following components [A] to [D], wherein the prepreg includes: a first layer in which the component [A] is impregnated with a first resin composition containing the components [B] and [C]; and a second layer that contains a second resin composition containing the components [B] to [D] and is formed on both surfaces of the first layer, and the first layer and the second layer are adjacent to each other, an average fiber diameter of a carbon fiber as the component [A] is 6 μm or more and 9 μm or less, and a content of a bifunctional amine type epoxy resin [B1] is 15 parts by mass or more and less than 40 parts by mass based on 100 parts by mass of a total amount of epoxy resin of the component [B]:

[A] a carbon fiber

[B] an epoxy resin

[C] a curing agent

[D] thermoplastic resin particles.

Hereinafter, the resin composition containing at least the components [B] to [D] may be simply referred to as "resin composition".

Effects of the Invention

According to the present invention, it is possible to provide a prepreg that is an intermediate base material for providing CFRP excellent in tensile strength, heat resistance and impact resistance, and suitable as a structural material of an aircraft body. Furthermore, it is possible to provide a prepreg that is excellent in the impregnating property of the resin composition into carbon fibers in the production process of the prepreg and the conveyance property of the prepreg.

EMBODIMENTS OF THE INVENTION

Hereinafter, the present invention will be described in more detail.

Examples of the carbon fiber of the component [A] include polyacrylonitrile-based carbon fibers and pitch-based carbon fibers, and polyacrylonitrile-based carbon fibers (PAN) having particularly high tensile strength are preferably used.

The average fiber diameter of the carbon fiber of the component [A] used in the present invention is 6 μm or more and 9 μm or less. By setting the average fiber diameter within the above range, impregnation of the matrix resin into the carbon fibers in the process of producing the prepreg is facilitated, and the effect of reducing the non-impregnated region in the carbon fiber layer in the prepreg is high. Therefore, in the process of conveying the prepreg by a slit processing device or an AFP device, generation of fuzz derived from carbon fibers in the non-impregnated region can be suppressed, so that the conveyance property of the prepreg is improved. Furthermore, also in the process of sufficiently impregnating the non-impregnated region of carbon fibers in the prepreg with the matrix resin at the time of molding the prepreg, the fluidity of the matrix resin can be increased, and the risk of generation of voids in CFRP can be reduced. This is considered to be because the prepreg of the present invention can increase the flow path of the matrix resin in the matrix resin impregnation process, as compared with a prepreg to which a carbon fiber having an average fiber diameter not within the above range is applied when the fiber volume ratio is the same. In addition, when the average fiber diameter is 9 μm or less, the concern of uneven stabilization in the fiber cross-sectional direction is reduced. Therefore, the tensile strength of the resulting CFRP can be increased, and in addition, the resulting prepreg is excellent in drapability. On the other hand, when the average fiber diameter is 6 μm or more, more preferably 7 μm or more, the above-described impregnating property is excellent, and the tensile strength of the resulting CFRP can also be increased. The average fiber diameter refers to an arithmetic average of the diameters of a plurality of monofilaments measured by the following method.

The average fiber diameter can be measured from a cross-sectional observation image of CFRP obtained from the prepreg. When the carbon fibers in the prepreg are continuous fibers arranged in one direction (hereinafter, referred to as unidirectional prepreg), 16 plies of unidirectional prepregs are pseudo-isotropically laminated in a [+45°/0°/−45°/90° ]2s configuration, and molded in an autoclave at a temperature of 180° C. for 2 hours, a pressure of 6 kg/cm$^2$, and a temperature raising rate of 1.5° C./min to prepare CFRP. The obtained CFRP sample is cut in a direction perpendicular to the 90° carbon fiber layer (the same direction as the carbon fiber direction in the 0° carbon fiber layer) to obtain a cross section. In the case of a prepreg other than the unidirectional prepreg, for example, in the case of a prepreg in which carbon fibers are a woven fabric, or in the case of a prepreg in which short fibers are dispersed in equal directions, the prepregs may be laminated in any configuration. When the CFRP is produced under the same conditions as described above, and then cut in any direction (direction orthogonal to the fiber direction in case of woven fabric prepreg) to obtain a cross section. The obtained cross section is observed with a laser microscope (for example, VHX-5000, manufactured by Keyence Corporation). An image obtained by observing a carbon fiber layer (90° layer) orthogonal to the cutting direction of the sample is subjected to image analysis using image analysis software (for example, image-Pro Premeier, manufactured by Nippon Roper K.K.) to calculate the diameter of the monofilament. One hundred monofilaments are selected from the cross-sectional image, the diameters of the monofilaments are measured, and the arithmetic average of the diameters is calculated and defined as an average fiber diameter.

The average fiber diameter can also be measured from a cross-sectional observation image of the prepreg itself. According to the method for obtaining a cross section from CFRP, the prepreg is cut with a sharp blade in a direction orthogonal to the carbon fiber or in any direction, and the obtained cross section is observed with a scanning electron microscope (SEM). The obtained cross section is subjected to image analysis using image analysis software in the same manner as described above to calculate the diameter of the monofilament. The average fiber diameter can be calculated by selecting 100 monofilaments from the cross-sectional image, measuring the diameters of the monofilaments, and calculating the arithmetic average of the diameters.

In any of the above cases, when 100 monofilaments are not sufficient to obtain the arithmetic average, 200 or 300 monofilaments may be selected to obtain the arithmetic average of their diameters.

The form and arrangement of the carbon fibers in the prepreg of the present invention are not limited. For example, continuous fibers arranged in one direction and a single tow; fabrics such as plain weave, satin weave, and twill weave; fiber structures such as knits, non-woven fabrics, mats, and braids can be used. Among them, a form of continuous fibers arranged in one direction, and a form of a woven fabric such as plain weave, satin weave, and twill weave are preferable. Herein, continuous fibers refer to fibers having an average length of 10 mm or more.

The tensile modulus of the carbon fiber used in the present invention is preferably in a range of 200 to 440 GPa. This range is preferable because the stiffness and strength of the CFRP are balanced at a high level. The lower limit of the elastic modulus is more preferably 230 GPa or more, and still more preferably 250 GPa or more. The upper limit of the elastic modulus is more preferably 400 GPa or less, and still more preferably 370 GPa or less.

The tensile elongation of the carbon fiber is preferably in a range of 0.8 to 3.0%. When the tensile elongation of the carbon fiber is low, the tensile strength and impact resistance of the resulting CFRP tend to decrease. When the tensile elongation exceeds 3.0%, the tensile modulus of the carbon fiber tends to decrease. The lower limit of the tensile elongation of the carbon fiber is more preferably 1.0% or more, and still more preferably 1.2% or more. The upper limit of the tensile elongation of the carbon fiber is more preferably 2.5% or less, and still more preferably 2.3% or less.

Herein, the tensile modulus and the tensile elongation of the carbon fiber are values measured according to JIS R7601 (2006).

The carbon fiber to be used for the present invention preferably contains 1,000 to 50,000 filaments per fiber bundle. If the number of filaments is less than 1,000, the fibers may be easily caused to meander, leading to a decrease in strength in some cases. In particular, from the viewpoint of being suitable for aerospace applications, the lower limit of the number of filaments is more preferably 2,500 or more, and the upper limit is more preferably 40,000 or less.

The properties and number of the carbon fibers may be within a range determined by a combination of any of the upper limits and any of the lower limits.

The component [B] in the present invention is an epoxy resin, and constitutes the basis of the mechanical properties of the CFRP and the handleability of the prepreg. The epoxy resin in the present invention means a compound having one or more epoxy groups in one molecule.

In the present invention, the component [B] contains a bifunctional amine type epoxy resin [B1]. The bifunctional amine type epoxy resin as the component [B1] refers to a glycidyl amine type epoxy resin containing two epoxy groups in one molecule. For example, diglycidyl aniline, a halogen-substituted derivative, an alkyl-substituted derivative, an aralkyl-substituted derivative, an allyl-substituted derivative, an alkoxy-substituted derivative, an aralkoxy-substituted derivative, an aryloxy-substituted derivative, and a hydrogenated compound thereof can be used.

As diglycidyl aniline, GAN (N,N-diglycidyl aniline, manufactured by Nippon Kayaku Co., Ltd.), "TOREP (registered trademark)" A-204E (N,N-diglycidyl-p-phenoxyaniline, manufactured by Toray Fine Chemicals Co., Ltd.), or the like can be preferably used. As diglycidyl toluidine, GOT (N,N-diglycidyl-o-toluidine, manufactured by Nippon Kayaku Co., Ltd.) or the like can be preferably used.

The bifunctional amine type epoxy resin as the component [B1] has an effect of decreasing the rubbery state elastic modulus of the cured matrix resin. By reducing the rubbery state elastic modulus of the cured matrix resin, CFRP obtained by curing the prepreg exhibits excellent tensile strength. As a conventional method for reducing the rubbery state elastic modulus, there are a method using a long-chain epoxy (bisphenol A type epoxy resin or bisphenol F type epoxy resin) having a large epoxy equivalent weight, and a method using an epoxy having a rigid skeleton in the skeleton, such as a dicyclopentadiene type epoxy or a biphenyl type epoxy. In the former, the elastic modulus and heat resistance of the matrix resin are significantly knocked down, and it is therefore difficult to use such a resin for aircraft applications. On the other hand, in the latter, the epoxy having a rigid skeleton can exhibit high elastic modulus and high heat resistance due to the effect of the rigid skeleton while lowering the crosslinking density by the rigid skeleton in the molecule. Thus, the latter resin is known as a resin suitable for aircraft applications from the viewpoint of mechanical properties.

A resin composition containing a bifunctional amine type epoxy resin as the component [B1] and a resin composition containing epoxy having a rigid skeleton such as a dicyclopentadiene type epoxy resin are compared with each other in terms of the impregnating property of the resin into carbon fibers having an average fiber diameter of less than 6 μm, which are common for aircraft applications, in the preparation of the prepreg. In the above comparison, there is almost no difference in impregnating property as long as both resins have the same viscosity, and it is difficult to highly impregnate the carbon fibers with these resins. However, in the prepreg of the present invention, carbon fibers having an average fiber diameter of 6 μm or more and 9 μm or less as the component [A] and the resin composition containing the component [B1] are used in combination. Combined use of these components yields a synergistic effect and greatly improves the impregnating property of the resin in the preparation of the prepreg. Specifically, carbon fibers having an average fiber diameter of 6 μm or more are impregnated with each of the resin composition containing the component [B1] of the present invention and the resin composition containing an epoxy resin having a rigid skeleton. At this time, the resin composition containing the component [B1] exhibits a greater effect of improving the impregnating property than the resin composition containing an epoxy resin having a rigid skeleton when both resins have substantially the same viscosities. In particular, the average fiber diameter of the carbon fibers of the component [B] is preferably 7 μm or more from the viewpoint of the effect of improving the impregnating property.

The reason why the impregnating property of the resin composition containing the component [B1] is good is presumed to be that the component [B1] has a molecular structure that hardly causes intermolecular interaction. In addition to the above reason, there is a factor that the component [B1] has good affinity with the environment of the surface of the carbon fibers. In addition, the following presumption can also be made. In the case of using carbon fibers having an average fiber diameter of less than 6 μm with which a large flow path cannot be secured in the process of impregnation of the matrix resin in the preparation of the prepreg, there is no difference in impregnating property between resins when any resin composition is used because impregnation with resin is originally difficult in such a case. On the other hand, in the case of using carbon fibers having an average fiber diameter of 6 μm or more with which a large flow path can be secured and using a resin composition containing the component [B1], as a matrix resin, the resin is easily impregnated into even minute portions of the carbon fibers.

In the present invention, the content of the bifunctional amine type epoxy resin as the component [B1] is 15 parts by mass or more and less than 40 parts by mass in 100 parts by mass of the total amount of the epoxy resin as the component [B]. By setting the content of the component [B] within this range, it is possible to balance mechanical properties such as tensile strength and heat resistance of the resulting CFRP. The content of the bifunctional amine type epoxy resin as the component [B1] is more preferably 25 parts by mass or more and 35 parts by mass or less in 100 parts by mass of the total amount of the epoxy resin as the component [B].

In the resin composition of the present invention, the epoxy resin as the component [B] may contain an epoxy resin other than the component [B1]. The epoxy resin is not particularly limited, and examples thereof include bisphenol type epoxy resins such as a bisphenol A type epoxy resin, a bisphenol F type epoxy resin, a bisphenol AD type epoxy resin, and a bisphenol S type epoxy resin; brominated epoxy resins such as tetrabromobisphenol A diglycidyl ether; and tri- or higher functional polyfunctional glycidyl amine type epoxy resins.

Here, the polyfunctional glycidyl amine type epoxy resin refers to a glycidyl amine type epoxy resin containing three or more epoxy groups in one molecule of the epoxy resin. Examples of usable polyfunctional glycidyl amine type epoxy resin include tetraglycidyl diaminodiphenyl methane, triglycidyl aminophenol, and tetraglycidyl xylylene diamine, as well as halogen-substituted derivatives, alkyl-substituted derivatives, aralkyl-substituted derivatives, allyl-substituted derivatives, alkoxy-substituted derivatives, aralkoxy-substituted derivatives, aryloxy-substituted derivatives, and hydrogenated compounds thereof.

As the compound tetraglycidyldiaminodiphenylmethane, for example, the following products are usable: "SUMI-EPOXY (registered trademark)" ELM434, (manufactured by Sumitomo Chemical Co., Ltd.), YH434L (manufactured by Nippon Steel & Sumitomo Metal Corp.), "jER (registered trademark)" 604 (manufactured by Mitsubishi Chemical Corp.), "Araldite (registered trademark)" MY720 and MY721 (manufactured by Huntsman Advanced Material LLC) and the like. As the compound triglycidyl aminophenol or an alkyl-substituted derivative thereof, the following products are usable: "SUMI-EPOXY (registered trademark)" ELM100 and ELM120 (manufactured by Sumitomo Chemical Co., Ltd.), "Araldite (registered trademark)" MY0500, MY0510 and MY0600 (manufactured by Huntsman Advanced Material LLC), and "jER (registered trademark)" 630 (manufactured by Mitsubishi Chemical Corp.). As the compound tetraglycidyl xylylenediamine or a hydrogenated compound thereof, the following products are usable: "TETRAD (registered trademark)"-X, and "TETRAD (registered trademark)"-C (manufactured by Mitsubishi Gas Chemical Co., Inc.).

When a tri- or higher functional polyfunctional glycidyl amine type epoxy resin is used as the epoxy resin of the component [B] of the present invention, the content thereof is preferably 30 parts by mass or more and 85 parts by mass or less in 100 parts by mass of the total amount of the epoxy resin of the component [B]. Within this range, it is possible to balance the heat resistance, impact resistance, and tensile strength of the resulting CFRP.

As the epoxy resin of the component [B] of the present invention, an epoxy resin that is solid at 25° C. can be contained. The content of the epoxy resin is preferably 5 parts by mass or less based on 100 parts by mass of the total amount of the epoxy resin of the component [B] from the viewpoint of the impregnating property.

The curing agent as the component [C] of the present invention may be a compound having an active group capable of reacting with the epoxy resin. As such an active group, for example, one having an amino group or an acid anhydride group can be used.

The component [C] is preferably an aromatic amine compound, and is preferably an aromatic amine compound having 1 to 4 phenyl groups in the molecule from the viewpoint of heat resistance and mechanical properties. Furthermore, it is preferable that the component [C] be an aromatic amine compound having at least one phenyl group contained in the skeleton of the curing agent, and that the phenyl group has an amino group at an ortho position or a meta position. This is because such a curing agent imparts a bent structure of the molecular skeleton to improve the resin elastic modulus, and can contribute to improvement in the mechanical properties. An aromatic polyamine compound having two or more phenyl groups having an amino group at a para position is preferably used from the viewpoint of heat resistance. Specific examples of such an aromatic amine include meta-phenylenediamine, diaminodiphenylmethane, diaminodiphenyl sulfone, meta-xylylenediamine, (p-phenylene methylene)dianiline, various derivatives such as alkyl-substituted derivatives of these compounds, and isomers having different positions of amino groups.

Among them, in the case of application for structural members of aircrafts and the like, it is preferable to use 4,4'-diaminodiphenyl sulfone or 3,3'-diaminodiphenyl sulfone from the viewpoint of obtaining a cured product having excellent heat resistance and elastic modulus, and further having a small decrease in heat resistance due to linear expansion coefficient and moisture absorption. These aromatic amine compounds may be used alone or in combination of two or more thereof. Moreover, when mixed with other components, the aromatic amine compound may be any form of powder or liquid, and both of the aromatic amine compounds of the powder and the liquid may be mixed and used.

Examples of commercially available products of the aromatic amine compound include SEIKACURE-S (manufactured by Seika Corporation), MDA-220 (manufactured by Mitsui Chemicals, Inc.), "LONZACURE (registered trademark)" M-DIPA (manufactured by Lonza), and "LONZACURE (registered trademark)" M-MIPA (manufactured by Lonza) and 3,3'-DAS (manufactured by Mitsui Chemicals, Inc.).

The content when an aromatic amine compound is used as the component [C] can be represented by the ratio of the total number of active hydrogens (H) in the aromatic amine to the total number of epoxy groups (E) in the epoxy resin as the component [B], so-called the ratio H/E, from the viewpoint of heat resistance and mechanical properties. When the ratio H/E is 0.6 or more, a sufficient degree of cure can be obtained, and the heat resistance of the cured product can be improved, which is preferable. On the other hand, when the ratio H/E is 1.3 or less, an unreacted portion of the curing agent can be reduced, and heat resistance can be improved, which is preferable.

In the present invention, a curing accelerator may be further contained as long as the heat resistance and thermal stability of the resin composition are not impaired. Examples of the curing accelerator include a tertiary amine, a lewis complex, an onium salt, an imidazole compound, a urea compound, a hydrazide compound, and a sulfonium salt. The content of the curing accelerator needs to be appropriately adjusted depending on the type to be used, and is 10 parts by mass or less, preferably 5 parts by mass or less based on 100 parts by mass of the total amount of the epoxy resin. When the curing accelerator is contained in such a range, temperature unevenness is less likely to occur when CFRP is molded, which is preferable.

The component [D] of the present invention is thermoplastic resin particles. Inclusion of the thermoplastic resin particles improves the mode II interlaminar fracture toughness of the resulting CFRP, and thus can improve impact resistance. The thermoplastic resin to be used for the thermoplastic resin particles is not particularly limited as long as the effect of the present invention can be obtained. From the viewpoint of imparting stable adhesive strength and impact resistance to the resulting CFRP, the thermoplastic resin is preferably one that maintains its form in the epoxy resin composition. Here, the phrase "maintaining the form" means that the thermoplastic resin particles [D] are not substantially dissolved in the epoxy resin composition when the epoxy resin composition in which the thermoplastic resin particles [D] are dispersed is heat-cured. The phrase "the thermoplastic resin particles [D] are not substantially dissolved" refers to, for example, a state in which, when the thermoplastic resin particles [D] in the cured resin are observed with a transmission electron microscope, the size of the thermoplastic resin particles [D] is not substantially reduced from the size before heat curing, and the thermoplastic resin particles [D] can be observed with a clear interface between the thermoplastic resin particles [D] and the matrix resin. As the thermoplastic resin used for the thermoplastic resin particles [D], a resin selected from polyamide, polyamideimide, and polyphenylene ether is preferable. Among polyamides, the following can be suitably used: polyamide 12, polyamide 11, polyamide 6, polyamide 66, a polyamide 6/12 copolymer, a polyamide (semi IPN polyamide) formed to have a semi IPN structure (macromolecular interpenetrating network structure) in the epoxy compound described in Example 1 of JP H1-104624 A, a polyamide copolymer having an alicyclic ring in the molecular skeleton, such as cyclohexane, and the like. The thermoplastic resin particles may be spherical particles, nonspherical particles, or porous particles. In a preferable aspect, however, the particles are spherical particles. This is because the spherical thermoplastic resin particles do not lower the flow property of the resin composition and thus the resin is excellent in viscoelasticity, the particles have no origin of stress concentration, and the particles provide high impact resistance. As the thermoplastic resin particles, the following products can be used: "Orgasol (registered trademark)" 1002D, 2001UD, 2001EXD, 2002D, 3202D, 3501D, and 3502D, (all are manufactured by Arkema S.A.), "Grilamid (registered trademark)" TR90 (manufactured by Emser Werke AG), "TROGAMID (registered trademark)" CX7323, CX9701, and CX9704 (manufactured by Evonik Industries AG), and the like, which are not true spherical particles. Of these thermoplastic resin particles, one type of thermoplastic resin particles may be used singly, or a plurality of types of thermoplastic resin particles may be used in combination. Examples of commercially available products of polyetherimide include "Ultem (registered trademark)" 1000, "Ultem (registered trademark)" 1010, and "Ultem (registered trademark)" 1040 (all are manufactured by SABIC Innovative Plastics).

In the present invention, the resin composition may contain a thermoplastic resin other than the thermoplastic resin particles of the component [D]. The thermoplastic resin other than the thermoplastic resin particles of the component [D] is contained for controlling the fluidity of the matrix resin when heat-curing a prepreg and improving the impact resistance and mode I interlaminar fracture toughness (Gic) of the resulting CFRP, and the like. At this time, the thermoplastic resin is preferably soluble in the epoxy resin of the component [B]. It is preferable to use a thermoplastic resin having a hydrogen-bonding functional group because the effect of improving the adhesiveness between the matrix resin and the carbon fibers can be expected. Examples of the hydrogen-bonding functional group include an alcoholic hydroxyl group, an amide bond, a sulfonyl group, a carboxyl group, and a carbonyl group.

In the present invention, the phrase "the thermoplastic resin is soluble in the epoxy resin" means that there is a temperature range in which the thermoplastic resin is mixed with the epoxy resin of the component [B] and heated and stirred to form a homogeneous phase. The temperature range in which a homogeneous phase is formed can be confirmed by mixing the thermoplastic resin with the epoxy resin and heating and stirring the mixture at a temperature equal to or lower than the glass transition temperature of the thermoplastic resin for several hours, for example, about 2 hours. The phrase "forming a homogeneous phase" refers to a state in which phase separation is not observed visually. In addition, improvement in compatibility also suppresses the formation of the phase-separated structure of the epoxy resin/thermoplastic resin in the curing process, thus yielding CFRP with constant quality regardless of the curing conditions. Furthermore, the range of possible curing conditions is expanded, and a structural difference depending on a part can be suppressed even when a thick CFRP is molded, so that the stability of quality can be improved.

Examples of the thermoplastic resin having an alcoholic hydroxyl group include polyvinyl acetal resins such as polyvinylformal and polyvinyl butyral; polyvinyl alcohol, and phenoxy resin.

Examples of the thermoplastic resin having an amide bond include polyamide, polyimide, polyamideimide, and polyvinylpyrrolidone.

Examples of the thermoplastic resin having a sulfonyl group include polysulfone and polyethersulfone.

Examples of the thermoplastic resin having a carboxyl group include polyester, polyamide, and polyamideimide. The carboxyl group may be present on either the main chain or the terminal, or both.

Examples of the thermoplastic resin having a carbonyl group include aromatic polyetherketones such as polyether ether ketone.

Among the above resins, polyamide, polyimide, and polysulfone may further have a functional group such as an ether bond or a carbonyl group in the main chain thereof. Polyamide may have a substituent on the nitrogen atom of the amide group.

Examples of commercially available products of a thermoplastic resin soluble in an epoxy resin and having a hydrogen-bonding functional group include "Mowital (registered trademark)" (manufactured by Kuraray Co., Ltd.) and "Vinylec (registered trademark)" K (manufactured by JNC Corporation) as polyvinyl acetal resins; "DENKA POVAL (registered trademark)" as polyvinyl alcohol resin (manufactured by Denka Company Limited); "Macromelt (registered trademark)" (manufactured by Henkel AG & Co. KGaA) "Amilan (registered trademark)" CM4000 (manufactured by Toray Industries, Inc.) as polyamide resin; "Ultem (registered trademark)" (manufactured by SABIC Innovative Plastics), "AURUM (registered trademark)" (manufactured by Mitsui Chemicals, Inc.), and "Vespel (registered trademark)" (manufactured by Du Pont) as polyimides; "Victrex (registered trademark)" as a polyether ether ketone polymer (manufactured by Victrex); "UDEL (registered trademark)" as polysulfone (manufactured by Solvay Advanced Polymers); and "Luviskol (registered trademark)" (manufactured by BASF SE) as polyvinylpyrrolidone.

Another suitable example of the thermoplastic resin soluble in the epoxy resin is a thermoplastic resin composed of a polyarylether skeleton. When the thermoplastic resin composed of a polyarylether skeleton is used, toughness can be imparted without impairing control of the tackiness property of the resulting prepreg, control of fluidity of a matrix resin when heat-curing a prepreg and heat resistance and elastic modulus of the resulting carbon fiber reinforced composite material.

Examples of the thermoplastic resin composed of a polyarylether skeleton include polysulfone, polyphenylsulfone, polyethersulfone, polyetherimide, polyphenylene ether, polyetheretherketone, and polyetherethersulfone. These thermoplastic resins composed of a polyarylether skeleton may be used singly, or two or more thereof may be used in combination.

Among them, polysulfone or polyethersulfone (hereinafter, sometimes referred to as "PES") is preferable from the viewpoint of imparting solubility in the epoxy resin, heat resistance, solvent resistance, and toughness.

PES has an ether bond and a sulfone bond in the main chain thereof. PES is contained for controlling the tackiness property of the prepreg, controlling the fluidity of the matrix resin when heat-curing the prepreg, and improving the tensile strength, impact resistance, and mode I interlaminar fracture toughness (Gic) while preventing deterioration of the heat resistance and elastic modulus of the resulting CFRP.

Examples of commercially available products of PES include "Virantage (registered trademark)" VW-10700RFP (weight average molecular weight: 21,000 g/mol) and "Virantage (registered trademark)" VW-10200RFP (weight average molecular weight: 46,500 g/mol) (all are manufactured by Solvay Advanced Polymers). In addition, "Sumika Excel (registered trademark)" PES5003P (manufactured by Sumitomo Chemical Co., Ltd.) is exemplified as a product having a weight average molecular weight similar to that of "Virantage (registered trademark)" VW-10200RFP.

When the content of the thermoplastic resin other than the component [D] is 5 parts by mass or more based on 100 parts by mass of the total amount of the epoxy resin as the component [B], mechanical properties such as tensile strength, impact resistance, and mode I interlaminar fracture toughness of CFRP can be enhanced, which is preferable. On the other hand, when the content of the thermoplastic resin other than the component [D] is 40 parts by mass or less, it is possible to suppress an increase in viscosity of the resin composition and to improve process stability in processes such as production of the resin composition, formation of the resin film, and formation of the prepreg, which is preferable. The content in this range is also preferable from the viewpoint of handleability of the prepreg such as the tackiness property.

The resin composition used in the prepreg of the present invention can contain a coupling agent; inorganic fillers such as silica gel, carbon black, clay, carbon nanotube, carbon particles, and metal powder; a flame retardant such as red phosphorus or phosphoric acid ester as long as the effect of the present invention is not impaired. In particular, inclusion of conductive particles such as carbon particles as the component [E] is preferable from the viewpoint of lightning resistance and the like in aircraft applications in order to dramatically improve the conductivity of CFRP. The blending amount of the conductive particles as the component [E] is preferably 1 part by mass or more based on 100 parts by mass of the total amount of the epoxy resin as the component [B]. When the blending amount is within this range, the resulting CFRP is excellent in conductivity. The upper limit of the blending amount is preferably 30 parts by mass or less. The conductivity of CFRP can be determined as the volume resistivity in the thickness direction, and is preferably 300 Ωcm or less, more preferably 35 Ωcm or less, and still more preferably 20 Ωcm or less. When conductive particles are used, for example, a method of blending conductive particles as shown in International Publication 2012/124450 can be used. The particle diameter of the carbon particles can be measured by applying a light scattering method, and using, for example, Partica LA-950V2 manufactured by HORIBA, Ltd., or MT3300 II manufactured by Microtrac Inc.

The heat resistance of CFRP obtained by curing the prepreg of the present invention depends on the glass transition temperature of the cured resin obtained by curing the resin composition. In order to obtain CFRP having excellent heat resistance, the glass transition temperature of a cured resin obtained by curing a resin composition to be used in a prepreg under conditions of a temperature of 180° C. for 2 hours (120 minutes) is preferably 180° C. or higher, and more preferably 185° C. or higher. When the glass transition temperature of the cured resin is 180° C. or higher, the mechanical properties of CFRP under high temperature and high humidity conditions are excellent. Here, the glass transition temperature is a temperature at an inflection point of a storage modulus G' obtained by measuring a cured plate of a resin composition cut out in a prescribed size at a temperature raising rate of 5° C./min and a frequency of 1 Hz using a dynamic viscoelasticity measuring device (for example, ARES G2 manufactured by TA Instruments).

In order to increase the glass transition temperature of the cured resin, it is preferable to use a tri- or higher functional polyfunctional glycidyl amine type epoxy resin as the epoxy resin of the component [B]. In particular, when the tri- or higher functional polyfunctional glycidyl amine type epoxy resin is contained in an amount of 50 parts by mass or more based on 100 parts by mass of the total amount of the epoxy resin as the component [B], it is easy to set the glass transition temperature of the cured resin within the above range, which is preferable. As described above, when diaminodiphenyl sulfone is used as the component [C], the glass transition temperature of the cured resin can be increased, and the glass transition temperature of the cured resin can be easily set within the above range, which is preferable. In particular, 4,4'-diaminodiphenyl sulfone is preferable.

In the prepreg of the present invention, the mass of carbon fibers per unit area (basis weight) is preferably 70 to 1,000 $g/m^2$. When the mass of carbon fibers is 70 $g/m^2$ or more, the basis weight of the carbon fibers in the width direction of the resulting prepreg tends to be uniform even when the degree of spreading of the carbon fiber bundle is uneven. When the mass of carbon fibers is 250 $g/m^2$ or more, the number of laminations is reduced in order to obtain a predetermined thickness at the time of molding CFRP, and lamination efficiency at the time of molding CFRP is further increased, which is more preferable.

When the mass proportion of carbon fibers in the prepreg is 50 mass % or more and 80 mass % or less, both the lightweight property of CFRP and reduction in voids generated due to molding can be achieved, which is preferable.

The prepreg of the present invention can be produced by various known methods. An example of the method is a hot-melt process in which an epoxy resin film is stacked on a surface of a carbon fiber sheet in which carbon fiber bundles are arranged in a sheet form, and the epoxy resin is impregnated into the carbon fibers under pressure and heating.

As a method for preparing the prepreg of the present invention by a hot-melt process, a multi-stage impregnation hot-melt process is preferred in which the resin composition is divided into multiple stages and impregnated by heating and pressurizing from both sides or one side of the carbon fiber of the component [A]. In the multiple-stage impregnation hot-melt process, the number of times the carbon fiber of the component [A] is impregnated with the resin composition is not limited, and the production cost increases as the number of times increases. Therefore, a so-called two-stage impregnation hot-melt process in which a resin composition is divided into two stages and impregnated by heating and pressurizing from both sides or one side of the carbon fiber of the component [A] is preferably used.

In the case of using the two-stage impregnation hot-melt process, first, a resin film containing a first resin composition is impregnated into carbon fibers from both sides of the carbon fibers to obtain a primary prepreg. Furthermore, a resin film containing the second resin composition is impregnated into the primary prepreg from both surfaces of the primary prepreg to obtain a prepreg. When the primary prepreg is impregnated with the resin film containing the second resin composition, non-impregnated carbon fibers in the prepreg are pressed by the resin film. As a result, the arrangement of the carbon fibers in the non-impregnated region may be sparse and dense. When the resulting prepreg is molded, there is a case where a wide flow path is formed at sites where the arrangement of carbon fibers is sparse, to thereby increase the fluidity of the matrix resin at the time of molding. Therefore, the two-stage impregnation hot-melt process is preferable from such a viewpoint.

The coefficient of variation of the average distance between carbon fibers in the first layer of CFRP obtained by curing the prepreg of the present invention is preferably 16% or more and less than 50%. The coefficient of variation is more preferably 16% or more and 30% or less, and still more preferably 16% or more and 25% or less. When the coefficient of variation is 16% or more, the fluidity of the matrix resin at the time of molding can be enhanced, which is preferable. When the coefficient of variation is less than 50%, cracking is less likely to occur in the carbon fiber layer and impact resistance can be secured, which is preferable. In addition, cracking of the carbon fiber layer refers to the presence of a portion where the second layer present on one surface of the first layer is continuous with the second layer on the other surface in a portion of the carbon fiber layer including few carbon fibers.

The coefficient of variation of the average distance between carbon fibers is measured by the following method. In the case of a unidirectional prepreg, 16 plies of unidirectional prepregs are pseudo-isotropically laminated in a [+45°/0°/−45°/90° ]2s configuration, and molded in an autoclave at a temperature of 180° C. for 2 hours, a pressure of 6 kg/cm$^2$, and a temperature raising rate of 1.5° C./min to prepare CFRP. In the case of a prepreg other than the unidirectional prepreg, prepregs may be laminated in any configuration, and CFRP is prepared under the same conditions as described above. The obtained CFRP sample is cut in the 0° direction to obtain a cross section. Using a laser microscope (for example, VHX-5000, manufactured by Keyence Corporation), a carbon fiber layer (90° layer) orthogonal to the cutting direction of the sample is observed at a magnification of 200 times and a field of view of 100 μm×150 μm. In this field of view, for example, in the case of a prepreg to which carbon fibers having an average fiber diameter of 7 μm are applied, about 450 carbon fibers are included in the cross-sectional image. The distance between a carbon fiber and another carbon fiber closest to the carbon fiber is defined as the distance between carbon fibers. From the obtained cross section, the distances are measured for all the carbon fibers included in the field of view using image analysis software (for example, image-Pro Premeier, manufactured by Nippon Roper K.K.). Then, the average value and the coefficient of variation of the distance between carbon fibers are calculated.

In order to set the coefficient of variation of the average distance between carbon fibers in the first layer of CFRP obtained by curing the prepreg of the present invention within the above range, it is preferable to use carbon fibers having an average fiber diameter of 6 μm or more and 9 μm or less as the component [A]. When the average fiber diameter of the carbon fibers is less than 6 μm, a sufficient resin flow does not occur in the production of the prepreg. Thus, there is a possibility that the coefficient of variation of the average distance between carbon fibers does not fall within the above range. In order to set the coefficient of variation of the average distance between carbon fibers within the above range, the minimum viscosity of the first resin composition is preferably 1.0 Pa·s or less. The minimum viscosity of the first resin composition will be described later.

The prepreg produced as described above has a structure in which the second layer containing the second resin composition containing the components [B] to [D] is formed adjacent to both surfaces of the first layer in which the carbon fibers of the component [A] is impregnated with the first resin composition containing the components [B] and [C] and not containing the component [D]. As described above, the use of the multi-stage process allows carbon fibers to be impregnated with different resin compositions in a stepwise manner. Therefore, it is possible to impart different viscoelastic properties to the first resin composition constituting the first layer and the second resin composition constituting the second layer, and impart the impregnating property in the production of the prepreg and at the time of molding the prepreg, the tackiness property of the resulting prepreg, and properties required for the processability of the prepreg in the automated lay-up device to the prepreg without being limited by the type of components of the resin composition and the content of each component, which is industrially advantageous.

The width of the prepreg is not particularly limited, and may be a large width of about several tens of cm to 2 m, or may be in the form of a tape having a width of several mm to several tens of mm, and the width can be selected according to the application. In recent years, in order to improve the efficiency of the process of laminating prepregs, a device called ATL or AFP for automatically laminating narrow-width prepregs or prepreg tapes has been widely used, and it is also preferable to set the width so as to be suitable for such a device. In ATL, a narrow-width prepreg having a width of about 7.5 cm, about 15 cm, or about 30 cm is often used, and in AFP, a prepreg tape having a width of about 3 mm to about 25 mm is often used. The method for obtaining a prepreg having a desired width is not particularly limited, and a method of producing a wide prepreg having a width of about 1 m to 2 m and then slitting the prepreg into a narrow width can be used. In addition, in order to simplify or omit the slit process, a prepreg tape such as a towpreg can be produced so as to have a desired width from the beginning.

When the prepreg tape is conveyed in a slit processing device or an AFP device, the prepreg tape may pass through a portion where the prepreg tape is largely bent, such as a small-diameter roll or a folded portion of the prepreg tape. At this time, when the prepreg tape is hard, the shape conformity of the prepreg tape at a portion where the prepreg tape is largely bent is poor. This may cause troubles such as deviation of the prepreg tape from a desired conveyance path, or breakage of the prepreg tape at a splice portion. Here, the splice refers to joining a plurality of prepreg tapes in the longitudinal direction by pressure-bonding or the like. Therefore, the prepreg is preferably soft, that is, has good drapability. In order to soften the prepreg, it is also possible to adjust the prepreg by the elastic modulus of the carbon fiber to be used or the type of the sizing agent. In the present invention, the prepreg is adjusted using carbon fibers having an average fiber diameter of 6 μm or more and 9 μm or less as the component [A]. When the average fiber diameter is too large, the stiffness of the prepreg increases, resulting in deterioration of drapability. When the average fiber diameter of the carbon fibers used for the prepreg is 9 μm or less, the shape conformity of the prepreg is good, thus reducing troubles such as breakage at the splice portion. The average fiber diameter of the carbon fibers is more preferably 7 μm or more and 8 μm or less.

In addition, the prepreg using a bifunctional amine type epoxy resin as the component [B1] is more excellent in drapability than that of the prepreg using an epoxy resin having a rigid skeleton such as a dicyclopentadiene type epoxy resin. It is considered that the drapability of the prepreg is affected by the storage modulus of the matrix resin with which the first layer is impregnated. It is presumed that in the case of using an epoxy having a rigid skeleton, the rigid skeleton portions interact with each other to increase the storage modulus, whereas in the case of using the component [B1], the intermolecular interaction is small and the storage modulus is low, resulting in good drapability.

The storage modulus G' of the first resin composition at 25° C. measured at an angular frequency of 3.14 rad/s is preferably $5.0\times10^3$ Pa or more and $5.0\times10^4$ Pa or less, and more preferably $7.0\times10^3$ or more and $3.0\times10^4$ Pa or less. When the storage modulus G' of the first resin composition at 25° C. falls within the above range, excellent drapability is exhibited while high impregnating property is satisfied, and thus handleability in an automated lay-up device is particularly excellent.

In order to set the storage modulus G' of the first resin composition within the above range, it is preferable to reduce the blending amount of the epoxy resin that is solid at 25° C. in the first resin composition, and to blend a thermoplastic resin soluble in the epoxy resin. In the first resin composition, the blending amount of the epoxy resin that is solid at 25° C. is preferably 10 parts by mass or less in 100 parts by mass of the total amount of the epoxy resin as the component [B]. The blending amount of the thermoplastic resin soluble in the epoxy resin is preferably in a range of 6 mass or more and 12 parts by mass or less based on 100 parts by mass of the total amount of the first resin composition.

A deflection angle that can be measured by the following method is used as an index for the drapability of the prepreg. One end of a prepreg cut into a width of 12.7 mm and a length of 400 mm is fixed to a horizontal desk, the prepreg is left in a state in which the prepreg protrudes from the end of the desk by 200 mm, and the deflection angle of the prepreg after 10 minutes is measured. At this time, an angle formed by a straight line obtained by horizontally extending the prepreg fixed to the desk and a straight line connecting the free end of the prepreg and the root of the protruding portion of the prepreg is defined as the deflection angle of the prepreg.

At this time, when the measured deflection angle is preferably in a range of 10° or more and 17° or less, and more preferably in a range of 12° or more and 16° or less, the shape conformity of the prepreg is good, and the trouble of breakage at the splice portion of the prepreg tape can be reduced.

The prepreg of the present invention is preferable because the tackiness property of the prepreg is reduced, so that the adhesion of the resin composition in the prepreg to the guide roll can be sufficiently reduced when the prepreg is conveyed.

A tackiness value between a prepreg and a metal measured by the following method is used as an index for the tackiness property. The tackiness value between the prepreg and the metal can be determined by the following procedure. A 10 mm square aluminum plate is attached to a weight portion of a tack tester (for example, handy tack tester, manufactured by IMADA Co., Ltd.) with a double-sided tape. The aluminum plate is pressed against the surface of the prepreg with a load of 0.5 kg for 0.1 seconds, and then, a force applied when the aluminum plate is pulled up at a speed of 100 mm/min is measured. At this time, when the tackiness value is 0.5 N or less, adhesion of the resin to the guide roll is small during conveyance in the AFP device, and the conveyance property is excellent. The tackiness value is more preferably 0.1 N or more and 0.4 N or less.

In order to set the tackiness value within the above range, the storage modulus G' at 20° C. of the second resin composition present on the surface layer of the prepreg measured at an angular frequency of 77 rad/s is preferably $2.0\times10^7$ Pa or more. The storage modulus G' is more preferably $2.0\times10^7$ Pa or more and $2.0\times10^9$ Pa or less. When the storage modulus G' is $2.0\times10^7$ Pa or more, the second resin composition coming into contact with the guide roll during conveyance is hardly deformed, so that the contact area of the resin composition with the guide roll is not increased. Therefore, the cleaning frequency is decreased and the productivity is improved, which is preferable. When the storage modulus G' is $2.0\times10^8$ Pa or less, resin powder is less likely to be generated on the surface of the prepreg when the prepreg is rubbed against the guide roll during conveyance of the prepreg, and the frequency of cleaning is reduced, which is preferable.

In order to set the storage modulus G' of the second resin composition within the above range, it is preferable to blend a thermoplastic resin soluble in the epoxy resin in the second resin composition. The blending amount of the thermoplastic resin soluble in the epoxy resin is preferably 14 parts by mass or more and 20 parts by mass or less based on 100 parts by mass of the total amount of the second resin composition.

The impregnation rate of the prepreg of the present invention, as measured using a water pick-up (WPU) method, is preferably 5.0% or less, more preferably 3.0% or less, and still more preferably 2.0% or less. When the impregnation rate measured using the WPU method is 5.0% or less, the amount of carbon fibers in the non-impregnated region to which the resin composition is not attached in the prepreg can be reduced. Thus, adhesion of fuzz to the blade during the slit processing and the guide roll during conveyance of the prepreg by AFP can be suppressed.

Here, the impregnation rate is measured as follows using the WPU method. Five prepregs each cut into a 100 mm×100 mm square having two sides in the 0° direction and the 90° direction at equal intervals in the width direction of the prepreg are prepared as test pieces. The mass W1 of each test piece is measured. The test piece is disposed such that the direction of the fibers included in the test piece is the vertical direction. A range of 5 mm from the end of the test piece (that is, a range of 100 mm×5 mm) is immersed in water for 5 minutes. Then, the mass W2 of the test piece after moisture adhered to the surface of the test piece is wiped off with a waste cloth or the like is obtained. The average value of the values (W2−W1)/W1 obtained for the five test pieces, expressed in percentage, is defined as the impregnation rate measured by the WPU method.

In the prepreg of the present invention, the minimum viscosity of the first resin composition is preferably 1.0 Pa·s or less. The lower limit of the minimum viscosity is more preferably 0.01 Pa·s or more, and still more preferably 0.1 Pa·s or more. The upper limit of the minimum viscosity is more preferably 0.5 Pa·s or less. When the carbon fibers having an average fiber diameter of 6 μm or more and 9 μm or less are used as the component [A] and further, the minimum viscosity of the first resin composition is set to 1.0 Pa·s or less, the impregnating property of the prepreg can be enhanced. With such a configuration, even a prepreg having a mass of carbon fibers per unit area of 250 $g/m^2$ or more, which has been difficult to impregnate with the resin in the conventional art, can be easily impregnated. Therefore, generation of fuzz derived from carbon fibers in the non-impregnated region can be suppressed in the process of conveying the prepreg tape in the slit processing device or the AFP device, and the conveyance property of the prepreg is excellent. In addition, since the fluidity of the first resin composition can be increased at the time of molding the prepreg, voids in the resulting CFRP can be reduced, and a decrease in the mechanical strength of CFRP can be prevented, which is preferable.

In order to set the minimum viscosity of the first resin composition within the above range, it is preferable to use diaminodiphenyl sulfone as the component [C] in the first resin composition. In addition, it is preferable that the blending amount of the thermoplastic resin soluble in the epoxy resin in the first resin composition be not excessively increased. The blending amount of the thermoplastic resin soluble in the epoxy resin is preferably in the range of 16 parts by mass or less based on 100 parts by mass of the total amount of the first resin composition. In order to set the lower limit of the minimum viscosity within the above range, the blending amount of the thermoplastic resin soluble in the epoxy resin is preferably 6.5 parts by mass or more based on 100 parts by mass of the total amount of the first resin composition.

The CFRP obtained by curing the prepreg of the present invention can be produced, for example, by a so-called hot-press molding method in which the prepregs of the present invention described above are laminated in a predetermined form, pressurized and heated to be shaped, and the resin is cured. As a hot-press molding method, a press molding method, an autoclave molding method, a bagging molding method, a wrapping tape method, an internal pressure molding method, and the like can be used.

When the prepreg of the present invention is used, the temperature for molding CFRP is preferably in a range of 150° C. to 220° C. When the molding temperature is set to such a temperature range, sufficient curability can be obtained.

The pressure at the time of molding CFRP by the autoclave molding method varies depending on the thickness of the prepreg, the volume content of the carbon fiber, and the like, but is preferably in a range of 0.1 to 1 MPa. When the molding pressure is set to the above range, it is possible to obtain CFRP which is free from defects such as voids in the resulting CFRP and which exhibits small dimensional variations such as warpage.

The CFRP obtained by curing the prepreg of the present invention has excellent tensile strength properties, heat resistance, and impact resistance.

Such tensile strength properties can be evaluated by 0° tensile strength measurement. Regarding the 0° direction of CFRP, as described in JIS K7017 (1999), the fiber direction of the unidirectional fiber reinforced composite material is defined as an axial direction, the axial direction is defined as a 0° axis, and the direction orthogonal to the axis is defined as 90°. A 0° tensile test is performed at room temperature (23° C.) in accordance with the standard of JIS K7073 (1988). In the present invention, the tensile strength of the CFRP is evaluated based on the tensile strength translation rate. The tensile strength translation rate (r) is a value represented by 0° tensile strength of CFRP/(tensile strength of carbon fiber strands×fiber volume content)×100. The high tensile strength translation rate indicates that CFRP more enhances the performance of the carbon fiber. Therefore, it can be said that the tensile strength translation rate is high and tensile strength properties are excellent. The tensile strength translation rate of the CFRP is preferably 85 or more, and more preferably 90% or more.

The impact resistance of the CFRP can be evaluated by compression after impact (hereinafter abbreviated as CAI). The CFRP obtained by curing the prepreg of the present invention preferably has a CAI of 250 MPa or more after an impact energy of 6.7 J per 1 mm of the thickness is applied to the test piece in accordance with JIS K7089 (1996). When the CAI is in such a range, the range of applicable structural members of aircrafts and the like is expanded, which is preferable.

The prepreg tape containing the prepreg of the present invention and the prepreg of the present invention or a carbon fiber composite material obtained by curing the prepreg tape of the present invention can also be preferably used for structural members of aircrafts and the like, for example.

EXAMPLES

Hereinafter, the present invention will be described in detail with reference to examples. However, the scope of the present invention is not limited to these Examples. The unit "part" of the composition ratio refers to part by mass unless otherwise noted. In addition, measurement of various properties (physical properties) was performed under the environment of a temperature of 23° C. and a relative humidity of 50% unless otherwise noted.

<Raw Materials Used in Examples and Comparative Examples>

(1) Component [A] Carbon Fibers

Carbon fibers 1: An acrylonitrile copolymer was polymerized using dimethyl sulfoxide (DMSO) as a solvent to obtain a spinning solution. The obtained spinning solution was coagulated by a dry-wet spinning method in which the spinning solution is once discharged into air from a spinneret, caused to pass through a space, and then introduced into a coagulation bath containing an aqueous solution of DMSO, thereby obtaining a coagulated yarn. The obtained coagulated yarn was washed with water and then drawn in a warm water bath. Then, a silicone-based oil agent was applied to the coagulated yarn, and the yarn was drawn to obtain a precursor fiber bundle for carbon fiber.

The obtained precursor fiber bundle for carbon fiber was heat-treated in air at 250° C. using a hot air circulation oven to obtain a stabilized fiber bundle. The obtained stabilized fiber bundle was preliminarily carbonized in a nitrogen atmosphere at a temperature of 300 to 800° C. Then, the fiber bundle was carbonized in a nitrogen atmosphere at a maximum temperature of 1,300° C. to obtain carbon fibers 1 having a total number of filaments of 24,000, a specific gravity of 1.8, and an average fiber diameter of 7 μm.

Carbon fibers 2: Carbon fibers 2 having a total number of filaments of 24,000, a specific gravity of 1.8, and an average fiber diameter of 5 μm were prepared in the same manner as in the carbon fibers 1 except that the average fiber diameter was changed by reducing the discharge amount of the spinning solution from the spinneret.

Carbon fibers 3: Carbon fibers 3 having a total number of filaments of 24,000, a specific gravity of 1.8, and an average fiber diameter of 10 μm were prepared in the same manner as in the carbon fibers 1 except that the average fiber diameter was changed by increasing the discharge amount of the spinning solution from the spinneret.

Carbon fibers 4: Carbon fibers 4 having a total number of filaments of 24,000, a specific gravity of 1.8, and an average fiber diameter of 6 μm were prepared in the same manner as in the carbon fibers 1 except that the average fiber diameter was changed by reducing the discharge amount of the spinning solution from the spinneret.

(2) Component [B1] Bifunctional Amine Type Epoxy Resin

GAN (N-diglycidyl aniline, manufactured by Nippon Kayaku Co., Ltd.)

"TOREP (registered trademark)" A-204E (N,N-diglycidyl-p-phenoxyaniline, manufactured by Toray Fine Chemicals Co., Ltd.)

GOT (N,N-diglycidyl-o-toluidine, manufactured by Nippon Kayaku Co., Ltd.).

(3) Epoxy Resin Other than Component [B1]

"SUMI-EPOXY (registered trademark)" ELM434 (N,N,N',N'-tetraglycidyl diaminodiphenylmethane, manufactured by Sumitomo Chemical Co., Ltd.)

"EPICLON (registered trademark)" 830 (bisphenol F type epoxy resin, manufactured by DIC Corporation)

"Araldite (registered trademark)" MY0510 (N,N,O-triglycidyl-p-aminophenol type epoxy resin, manufactured by Huntsman Advanced Material LLC)

"Araldite (registered trademark)" MY0600 (N,N,O-triglycidyl-m-aminophenol type epoxy resin, manufactured by Huntsman Advanced Material LLC)

"EPICLON" HP-7200L (dicyclopentadiene type epoxy, manufactured by DIC Corporation).

(4) Component [C] Curing Agent

SEIKACURE-S (4,4'-DDS, manufactured by Seika Corporation.)

3,3'-DAS (3,3'-DDS, manufactured by Mitsui Fine Chemicals, Inc.).

(5) Component [D] Thermoplastic Resin Particles

Polyamide particles 1: Epoxy-modified polyamide particles were obtained in the same manner as the epoxy-modified polyamide particles used in Examples (for example, Examples 1 and 2) of International Publication 2012/124450 (mode diameter: 14 μm, sphericity: 97). Raw materials are transparent polyamide ("Grilamid (registered trademark)" TR55, manufactured by EMS-CHEMIE (Japan) Ltd.), epoxy resin ("jER (registered trademark)" 828, manufactured by Mitsubishi Chemical Corporation), and curing agent ("TOHMIDE (registered trademark)" #296, manufactured by T & K TOKA Corporation). The particle diameter was measured using MT3300 II (light source: 780 nm–3 mW, wet cell (medium: water)) manufactured by Microtrac Inc.

(6) Thermoplastic Resin

"Virantage (registered trademark)" VW-10700RFP (PES, manufactured by Solvay Advanced Polymers, weight-average molecular weight: 21,000 g/mol)

"Virantage (registered trademark)" VW-10200RFP (PES, manufactured by Solvay Advanced Polymers, weight-average molecular weight: 46,500 g/mol).

(7) Conductive Particles

Conductive particles

"Mitsubishi (registered trademark)" Conductive Carbon Black #3230B (particle diameter of primary particles: 23 nm (arithmetic average diameter determined by observing carbon black particles with an electron microscope), manufactured by Mitsubishi Chemical Corporation)

Carbon particles "NICABEADS (registered trademark)" ICB2020 (average particle diameter: 20 μm, manufactured by Nippon Carbon Co., Ltd.).

<Various Evaluation Methods>

(8) Preparation of Resin Composition

The epoxy resin as the component [B] and the thermoplastic resin described in (6) were kneaded, and the mixture was heated to 150° C. or higher and stirred as it was for 1 hour to dissolve the thermoplastic resin, thereby affording a transparent viscous liquid. This liquid was cooled while being kneaded, and then the curing agent of the component [C] described in (4) was added and further kneaded to obtain a first resin composition.

In addition, a transparent viscous liquid described above is prepared, and the liquid was cooled while being kneaded. Then, the thermoplastic resin particles of the component [D] described in (5) were added and kneaded to the mixture, and then the component [C] was further added and kneaded to obtain a second resin composition.

When the resin composition contains the conductive particles of the component [E] described in (7), the component [E] was added at the same timing as the component [B] in both the first resin composition and the second resin composition.

The composition ratios of the resin compositions of Examples and Comparative Examples were as shown in Tables 1 to 5.

(9) Measurement of Minimum Viscosity of Resin Composition

The minimum viscosity of the resin composition was measured using a dynamic viscoelastometer ARES-G2 (manufactured by TA Instruments). A flat parallel plate having a diameter of 40 mm was used as the upper and lower measurement jigs, and the resin composition was set between the upper and lower jigs so that the distance between the jigs was 1 mm. Then, the minimum viscosity was determined when the dynamic viscoelasticity was measured while the temperature was raised at an angular frequency of 10 rad/s and a rate of 2.0° C./min.

(10) Measurement of Storage Modulus G' of Second Resin Composition

The storage modulus G' of the second resin composition was measured using a dynamic viscoelastometer ARES-G2 (manufactured by TA Instruments). A flat parallel plate having a diameter of 8 mm was used as the upper and lower measurement jigs, and the resin composition was set between the upper and lower jigs so that the distance between the jigs was 0.5 mm. Then, the dynamic viscoelasticity was measured while the temperature was raised at an angular frequency of 77 rad/s and a temperature raising rate of 2.0° C./min. The storage modulus G' at a temperature of 20° C. was read from a storage modulus G' curve obtained by temperature rising measurement.

(11) Measurement of Glass Transition Temperature of Cured Resin

For the first resin composition and the second resin composition used in each of Examples and Comparative Examples, resin compositions for measuring the glass transition temperature were prepared. The resin compositions were prepared by blending only the components [B] and [C] among the components used in each example in the proportions shown in Tables 1 to 3.

Each of the resin compositions for measuring the glass transition temperature was injected into a mold, then heated at a rate of 1.5° C./min from 30° C. in a hot air dryer, and heated and cured at a temperature of 180° C. for 2 hours to prepare a cured resin plate having a thickness of 2 mm.

A test piece with a width of 12.7 mm and a length of 55 mm was cut out of the prepared cured resin plate, and its glass transition temperature was determined by a DMA method according to SACMA SRM18R-94.

In a storage modulus G' curve, a temperature at the intersection point between a tangent in glass region and a tangent in transition region was taken as the glass transition temperature. Here, the measurement was performed at a temperature raising rate of 5.0° C./min and a frequency of 1 Hz.

(12) Preparation of Prepreg

In the present Examples, the prepreg was prepared using a two-stage impregnation method as follows. The first resin composition and the second resin composition prepared in the above (8) were each uniformly applied onto release paper coated with silicone to obtain a first resin film (resin mass: 35 g/m$^2$) and a second resin film (resin mass: 35 g/m$^2$). Carbon fibers uniformly arranged in one direction were sandwiched between two first resin films, and heated and pressurized using a press roll. Thus, a primary prepreg was obtained in which the carbon fibers were impregnated with the first resin composition, mainly as a base of the first layer (mass of carbon fibers per unit area: 268 g/m$^2$, resin content: 20 mass %). Both release papers were peeled off from the obtained primary prepreg. Next, the primary prepreg was sandwiched between two second resin films, and heated and pressurized using a press roll. Thus, a prepreg was obtained in which the primary prepreg was impregnated with the second resin composition, mainly as a base of the second layer (mass of carbon fibers per unit area: 268 g/m$^2$, resin content: 34 mass %). In all Examples and Comparative Examples, heating and pressurizing conditions for preparing the primary prepreg and the secondary prepreg, and line speeds for producing the prepregs were the same.

(13) Evaluation of Impregnation Rate of Prepreg (Water Pickup Method)

Five prepregs each cut into a square having a size of 100 mm in the width direction×100 mm in the longitudinal direction at equal intervals in the width direction of the prepreg were prepared as test pieces. The mass W1 of the test piece was measured. One side of the test piece was disposed such that the direction of the fibers included in the test piece was the vertical direction. A range of 5 mm from the end of the test piece (that is, a range of 100 mm×5 mm) was immersed in water for 5 minutes. Then, the mass W2 of the test piece after moisture adhered to the surface of the test piece was wiped off with a waste cloth or the like was obtained. The average value of the values (W2−W1)/W1 obtained for the five test pieces, expressed in percentage, was defined as the impregnation rate. A case where the impregnation rate was 5% or less was defined as acceptable.

(14) Measurement of Tackiness Between Prepreg and Metal

The tackiness between the prepreg and the metal was determined by the following procedure. A 10 mm square aluminum plate was attached to a weight portion of a handy tack tester (manufactured by IMADA Co., Ltd.) with a double-sided tape. The aluminum plate is pressed against the surface of the prepreg with a load of 0.5 kg for 0.1 seconds, and then, a force applied when the aluminum plate is pulled up at a speed of 100 mm/min was measured. The measurement was performed in an environment of a temperature of 25° C. and a humidity of 50 RH %. A case where the tackiness value was 0.5 N or less was defined as acceptable.

(15) Evaluation of Drapability of Prepreg

One end of a prepreg cut into a width of 12.7 mm and a length of 400 mm was fixed to a horizontal desk. The prepreg was left in a state in which the prepreg protrudes from the end of the desk by 200 mm in the lengthwise direction. The deflection angle of the prepreg after 10 minutes was used as an index of the drapability. At this time, an angle formed by a straight line obtained by horizontally extending the prepreg fixed to the desk and a straight line connecting the free end of the prepreg and the root of the protruding portion of the prepreg was defined as the deflection angle of the prepreg. A case where the deflection angle was 10° or more was defined as acceptable.

(16) Evaluation of Tensile Strength Translation Rate of CFRP

The unidirectional prepreg was cut into a predetermined size, and four prepregs were laminated in one direction, and then molded in an autoclave under conditions of a temperature of 180° C. for 2 hours, a pressure of 6 kg/cm$^2$, and a temperature raising rate of 1.5° C./min to prepare CFRP. The obtained CFRP was cut into a width of 12.7 mm and a length of 230 mm, and tabs made of glass fiber reinforced plastic having a length of 1.2 mm and a length of 50 mm were bonded to both ends to obtain a test piece. This test piece was subjected to a 0° tensile test in accordance with the standard of JIS K7073 (1988) using an Instron universal tester. The measurement temperature was room temperature (23° C.).

The tensile strength translation rate (%) was calculated from 0° tensile strength of CFRP/(tensile strength of carbon fiber strands×fiber volume content)×100. The fiber volume content was measured according to ASTM D 3171 (2004), and the measured value was used.

(17) Measurement of Compression after Impact (CAI) of CFRP

Sixteen plies of unidirectional prepregs were pseudo-isotropically laminated in a [+45°/0°/−45°/90° ]2s configuration, and molded in an autoclave under conditions of a temperature of 180° C. for 2 hours, a pressure of 6 kg/cm$^2$, and a temperature raising rate of 1.5° C./min to prepare CFRP. A sample of 150 mm length and 100 mm width was cut out from the obtained CFRP, a drop impact of 6.7 J/mm was applied to the center of the sample in accordance with SACMA SRM 2R-94, and the compression after impact was determined.

(18) Method for Measuring Conductivity of CFRP in Thickness Direction

Sixteen plies of unidirectional prepregs were pseudo-isotropically laminated in a [+45°/0°/−45°/90° ]2s configuration, and molded in an autoclave under conditions of a temperature of 180° C. for 2 hours, a pressure of 6 kg/cm$^2$, and a temperature raising rate of 1.5° C./min to prepare CFRP. A sample of 40 mm length and 40 mm width was cut out from the obtained CFRP, and the resin layers on both surfaces were removed by grinding. Thereafter, a conductive paste N-2057 (manufactured by SHOEI CHEMICAL INC.) was applied to both surfaces with a thickness of about 70 μm using a bar coater, and cured over 30 minutes in a hot air oven adjusted to a temperature of 180° C. Thus, a sample for evaluating conductivity was obtained. The resistance of the obtained sample in the thickness direction was measured by a four-probe method using an R6581 digital multimeter manufactured by ADVANTEST CORPORATION. The measurement was performed six times, and the average value was taken as the volume resistivity (Ωcm) of the CFRP in the thickness direction.

(19) Measurement of Average Value of Distances Between Carbon Fibers and Coefficient of Variation Sixteen plies of unidirectional prepregs were pseudo-isotropically laminated in a [+45°/0°/−45°/90° ]2s configuration, and molded in an autoclave under conditions of a temperature of 180° C. for 2 hours, a pressure of 6 kg/cm$^2$, and a temperature raising rate of 1.5° C./min to prepare CFRP. The obtained CFRP sample was cut in the 0° direction to obtain a cross section. Using a laser microscope (VHX-5000, manufactured by Keyence Corporation), a carbon fiber layer (900 layer) orthogonal to the cutting direction of the sample was observed at a magnification of 200 times and a field of view of 100 μm×150 μm. Five cross-sectional images were acquired, and from the obtained cross section, the distances between the respective carbon fibers were measured for all the carbon fibers included in the field of view using software image-Pro Premeier (manufactured by Nippon Roper K.K.). Then, the average value of distances between carbon fibers and the coefficient of variation thereof were calculated.

Example 1

Using GAN as the component [B1], "SUMI-EPOXY (registered trademark)" ELM434 as the epoxy resin of the component [B] other than the component [B1], SEIKACURE-S as the component [C], and "Virantage (registered trademark)" VW-10700RFP as the thermoplastic resin, a first resin composition was prepared at the composition ratio shown in Table 1 according to the above "(8) Preparation of resin composition". Next, using the polyamide particles 1 as the component [D] in addition to the same components as the first resin composition, a second resin composition was prepared at the composition ratio shown in Table 1 according to the above "(8) Preparation of resin composition".

Furthermore, using the carbon fibers 1 as the carbon fibers of the component [A], and the first resin composition and the second resin composition prepared above, a prepreg was prepared according to the above "(12) Preparation of prepreg" (mass of carbon fibers: 268 g/m$^2$, resin content: 34 mass %).

As shown in Table 1, by setting the average fiber diameter of the carbon fibers as the component [A] within an appropriate range, all of the impregnation rate measured by the WPU method, the deflection angle of the prepreg, and the tackiness value were acceptable. Thus, a prepreg was obtained in which generation of fuzz during conveyance of the prepreg is suppressed and which exhibits excellent shape conformity. In addition, the impregnating property of the resin when the prepreg was molded was good. Thus, CFRP was obtained which has no voids and exhibits excellent heat resistance, tensile strength translation rate, and impact resistance. When the cross section of the CFRP obtained at this time was observed, the average value of the distances between carbon fibers in the first layer was 0.15 μm, the coefficient of variation of the distances between carbon fibers was 20%, and sites where the arrangement of carbon fibers was dense and sites where the arrangement of carbon fibers was sparse were confirmed. It is considered that presence of the sparse portion in the arrangement of the carbon fibers ensures the flow path for impregnation of the matrix resin, thus improving the impregnating property.

Comparative Examples 1 and 2

Prepregs were produced in the same manner as in Example 1 with the compositions and composition ratios shown in Table 1.

In Comparative Example 1, since the average fiber diameter of the carbon fibers was small, both the impregnating property of the obtained prepreg and the deflection angle of the prepreg were unacceptable, and thus the handleability during conveyance of the prepreg was poor. The coefficient of variation of the distance between carbon fibers in the first layer when observing the cross section of the CFRP obtained at this time was 125, and there were few sites where the arrangement of carbon fibers was dense and sites where the arrangement of carbon fibers was sparse.

In Comparative Example 2, since the average fiber diameter of the carbon fibers was too large, the impregnating property was acceptable, but the deflection angle of the prepreg was unacceptable, and thus the shape conformity of the prepreg was poor.

Example 2

A prepreg (mass of carbon fibers: 268 g/m$^2$, resin content: 32 mass %) was obtained by performing the same procedure as in Example 1 except that the basis weight of the resin film was 32 g/m$^2$ for both the first resin film and the second resin film at the composition ratio shown in Table 1.

As shown in Table 1, by setting the average fiber diameter of the carbon fibers of the component [A] within an appropriate range, the impregnating property was acceptable despite the low resin content, and both the deflection angle of the prepreg and the tackiness force were acceptable. A prepreg in which generation of fuzz during conveyance of the prepreg was suppressed and which exhibits excellent shape conformity was obtained. In addition, since the impregnation rate was high, no void was generated, and CFRP excellent in impact resistance was obtained. The coefficient of variation of the distance between carbon fibers in the first layer when observing the cross section of the CFRP obtained at this time was 20%, and sites where the arrangement of carbon fibers was dense and sites where the arrangement of carbon fibers was sparse were confirmed. It is considered that presence of the sparse portion in the arrangement of the carbon fibers ensures the flow path for impregnation of the matrix resin, thus improving the impregnating property.

Example 18

A prepreg (mass of carbon fibers: 268 g/m$^2$, resin content: 34 mass %) was obtained by performing the same procedure as in Example 1 except that carbon fibers having an average fiber diameter of 6 μm were used as the component [A]. As shown in Table 1, by setting the average fiber diameter of the carbon fibers of the component [A] within an appropriate range, all of the impregnating property, the deflection angle of the prepreg, and the tackiness force were acceptable. A prepreg in which generation of fuzz during conveyance of the prepreg was suppressed and which exhibits excellent shape conformity was obtained. The coefficient of variation of the distance between carbon fibers in the first layer when observing the cross section of the CFRP obtained at this time was 16% and sites where the arrangement of carbon fibers was dense and sites where the arrangement of carbon fibers was sparse were confirmed. It is considered that presence of the sparse portion in the arrangement of the carbon fibers ensures the flow path for impregnation of the matrix resin, thus improving the impregnating property.

Comparative Example 3

A prepreg was prepared in the same manner as in Example 2 with the composition ratio shown in Table 1. In Comparative Example 3, since the average fiber diameter of the carbon fibers was small, the impregnation rate was unacceptable. Since the degree of impregnation was poor, fuzz was generated during conveyance of the prepreg. Moreover, voids were generated in the CFRP, and the CAI of the obtained CFRP was insufficient. The coefficient of variation of the distance between carbon fibers in the first layer when observing the cross section of the CFRP obtained at this time was 11%, and there were few sites where the arrangement of carbon fibers was dense and sites where the arrangement of carbon fibers was sparse.

Comparative Examples 10 to 12

Using "SUMI-EPOXY (registered trademark)" ELM434, "EPICLON" HP7200L, and "EPICLON" 830 as the epoxy resin of the component [B], SEIKACURE-S as the component [C], and "Virantage (registered trademark)" VW-10700RFP as the thermoplastic resin without using the bifunctional amine type epoxy resin of the component [B1], a first resin composition was prepared at the composition ratio shown in Table 2 according to the above "(8) Preparation of resin composition". Next, using the polyamide particles 1 as the component [D] in addition to the same components as the first resin composition, a second resin composition was prepared at the composition ratio shown in Table 2 according to the above "(8) Preparation of resin composition".

Furthermore, using the carbon fibers shown in Table 2 as the carbon fibers of the component [A], and the first and second resin compositions prepared above, each prepregs was prepared according to the above "(12) Preparation of prepreg" (mass of carbon fibers: 268 g/m$^2$, resin content: 34 mass %).

It is found that the effect of improving the impregnating property of Comparative Example 11 with respect to Comparative Example 10 is small, as compared with the improvement in the impregnating property of Example 1 with respect to Comparative Example 1. It is found to be important to contain a bifunctional amine type epoxy resin of the component [B1] as the matrix resin, rather than a dicyclopentadiene type epoxy.

Examples 3 to 6

Prepregs were prepared in the same manner as in Example 1 with the composition ratios shown in Table 3. The blending amount of the bifunctional amine type epoxy resin as the component [B1] is changed. In all of Examples, the impregnating property, the deflection angle, and the tackiness value of the prepreg were all acceptable. In all of Examples, prepregs in which generation of fuzz during conveyance of the prepreg was suppressed and which exhibits excellent shape conformity were obtained. In addition, since all of Examples have a preferable composition, CFRPs excellent in the balance between heat resistance and tensile strength translation rate were obtained.

Comparative Example 4

A prepreg was prepared in the same manner as in Example 1 with the composition ratio shown in Table 3. The impregnating property, the deflection angle, and the tackiness value of the prepreg itself were acceptable. However, the tensile strength translation rate of the obtained CFRP was insufficient because the blending amount of the bifunctional amine type epoxy resin as the component [B1] was small.

Comparative Examples 5 and 6

A prepreg was prepared in the same manner as in Example 1 with the composition ratio shown in Table 3. The impregnating property, the deflection angle, and the tackiness value of the prepreg itself were acceptable. However, the glass transition temperature of the cured resin was low, and the heat resistance of the obtained CFRP was insufficient because the blending amount of the bifunctional amine type epoxy resin as the component [B1] was too large.

Examples 7 and 8

Prepregs were prepared in the same manner as in Example 1 with the composition ratios shown in Table 4. The impregnating property, the deflection angle, and the tackiness value of the prepreg itself were acceptable. Prepregs in which generation of fuzz during conveyance of the prepreg was suppressed and which exhibit excellent shape conformity were obtained. Since the blending amount of the bifunctional amine type epoxy resin of the component [B1] was an appropriate amount, CFRPs excellent in the balance between heat resistance and tensile strength translation rate were obtained.

Comparative Example 7

A prepregs was prepared in the same manner as in Example 1 with the composition ratio shown in Table 4. Since the bifunctional amine type epoxy resin as the component [B1] was not contained, the tensile strength translation rate of the obtained CFRP was low.

Comparative Example 8

A resin composition was prepared by the method described in the above "(8) Preparation of resin composition" in the composition ratio of the second resin composition of Example 1 in Table 1. The prepreg was produced not by the above "(12) Preparation of prepreg" but by the following one-stage impregnation method. That is, the prepared resin composition was uniformly applied onto release paper coated with silicone to obtain a resin film (resin mass: 70 g/m). Carbon fibers uniformly arranged in one direction were sandwiched between two resin films, and heated and pressurized using a press roll to obtain a prepreg in which carbon fibers were impregnated with a resin composition (mass of carbon fibers: 268 g/m$^2$, resin content: 34 mass-). At this time, the carbon fibers 1 were used as the carbon fibers of the component [A].

The impregnation rate of the prepared prepreg was as high as 9% (unacceptable), and the conveyance property of the prepreg was poor. When the cross section of the obtained CFRP was observed, the coefficient of variation of the distance between carbon fibers was as low as 9%. It is considered that the impregnating property was insufficient because the arrangement of the carbon fibers was uniform and there was no site where the arrangement of the carbon fibers serving as the impregnation flow path was sparse. In addition, voids were observed in the CFRP due to low impregnating property, and the CAI was 201 MPa, which was insufficient.

Examples 10 to 13

Prepregs were prepared in the same manner as in Example 1 with the composition ratios shown in Table 5. By setting the average fiber diameter of the carbon fibers as the component [A] within an appropriate range and setting the minimum viscosity of the first resin composition and the storage modulus G' of the second resin composition within appropriate ranges, the impregnating property, the deflection angle, and the tackiness value of the prepreg were all acceptable. Therefore, when the obtained prepreg was conveyed, adhesion of fuzz was suppressed, and adhesion of the resin to the guide roll during conveyance of the prepreg was also small. In particular, in Example 13, the minimum viscosity of the first resin composition was low and the storage modulus G' of the second resin composition was moderately high. Therefore, the impregnating property and the tackiness property were highly balanced, and the handle-ability during conveyance of the prepreg was excellent.

Examples 14, 15

Prepregs were prepared in the same manner as in Example 1 with the composition ratios shown in Table 6. The impregnating property, the deflection angle, and the tackiness value of the prepreg were all acceptable. Therefore, when the obtained prepreg was conveyed, adhesion of fuzz was suppressed, and adhesion of the resin to the guide roll during conveyance of the prepreg was also small. In the present Examples, since conductive particles were added, the volume resistivity of the resulting CFRP in the thickness direction was 30 Ωcm in Example 14 and 25 Ωcm in Example 15. On the other hand, the volume resistivity of Example 1, in which conductive particles were not added, was 950 Ωcm, and thus the conductivities of Examples 14 and 15 were improved as compared with Example 1. Accordingly, when these materials are applied to an aircraft, lightning resistance is expected to be improved. The handle-ability of the resulting prepreg and the mechanical properties of the CFRP were both good.

Example 16

A resin composition was prepared in the same manner as in Example 14 except that carbon black was contained, and a prepreg was obtained. The impregnating property, the deflection angle, and the tackiness value of the prepreg were all acceptable. Therefore, when the obtained prepreg was conveyed, adhesion of fuzz was suppressed, and adhesion of the resin to the guide roll during conveyance of the prepreg was also small. As in Example 14, preferable properties were obtained. In addition, the volume resistivity in the CFRP thickness direction was 14 Ωcm.

Example 17

A prepreg was prepared by using the carbon fibers 1 as the carbon fibers of component [A] and performing the same procedure as in Example 1 in the same composition ratio as in Example 1 in Table 1 except that the mass of carbon fibers was 540 g/m$^2$, the mass of resin of the first resin film was 70 g/m$^2$, and the mass of resin of the second resin film was 70 g/m$^2$. A prepreg having an impregnation rate of 4 (acceptable) and a deflection angle of 120 (acceptable) as an index of the drapability was obtained. Since the impregnation rate was small, and the impregnating property of the resin when the prepreg was molded was good, voids in the CFRP were not generated. In addition, the drapability as an index of the shape conformity was good, and the tensile strength translation rate of the resulting CFRP was 90%. Thus, excellent mechanical properties were obtained.

Comparative Example 9

A prepreg was prepared using the carbon fibers 2 as the carbon fibers of the component [A], in the same manner as in Example 17 at the same composition ratio as in Comparative Example 1 in Table 1. Since carbon fibers having a small average fiber diameter were used and the mass of carbon fibers of the prepreg was large, a prepreg having an impregnation rate as large as 10% (unacceptable) was obtained. Voids were observed in the resulting CFRP, and the CAI was 187 MPa, which was insufficient.

TABLE 1

| | | | Example 1 | | Example 2 | | Example 18 | |
|---|---|---|---|---|---|---|---|---|
| Carbon fiber | Component [A] | | Carbon fibers 1 | | Carbon fibers 1 | | Carbon fibers 4 | |
| 1: First resin composition 2: Second resin composition | | | 1 | 2 | 1 | 2 | 1 | 2 |
| Epoxy resin | Component [B1] | GAN | 30 | 30 | 30 | 30 | 30 | 30 |
| | Component [B] other than [B1] | "SUMI-EPOXY ®" ELM434 | 70 | 70 | 70 | 70 | 70 | 70 |
| | | "EPICLON ®" HP7200L | | | | | | |
| | | "EPICLON ®" 830 | | | | | | |
| Curing agent | Component [C] | SEIKACURE-S | 51 | 51 | — | — | 51 | 51 |
| | | 3,3'-DAS | — | — | 51 | 51 | — | — |
| Thermoplastic resin particles | Component [D] | Polyamide particles 1 | — | 42 | — | 42 | — | 42 |
| Thermoplastic resin | Other components | "Virantage ®" VW-10700RFP | 17 | 35 | 17 | 35 | 17 | 35 |

TABLE 1-continued

| | | | | | | | | |
|---|---|---|---|---|---|---|---|---|
| Properties of resin composition | Minimum viscosity (Pa · s) | | 0.2 | — | 0.5 | — | 0.2 | — |
| | G' [20° C., 77 rad/s] (Pa) | | — | $3.5 \times 10^7$ | — | $3.5 \times 10^7$ | — | $3.5 \times 10^7$ |
| | Glass transition temperature (° C.) of cured product | | 195 | | 183 | | 195 | |
| Prepreg properties | Impregnation rate (%) [index of impregnating property] | | 2 | | 3 | | 4 | |
| | Deflection angle (°) [index of drapability] | | 15 | | 14 | | 17 | |
| | Tackiness value (N) [index of tackiness property] | | 0.3 | | 0.2 | | 0.3 | |
| | Resin content (mass %) | | 34 | | 32 | | 34 | |
| CFRP properties | Tensile strength translation rate (%) | | 91 | | 92 | | 91 | |
| | CAI (MPa) | | 290 | | 280 | | 286 | |

| | | | Comparative Example 1 | | Comparative Example 2 | | Comparative Example 3 | |
|---|---|---|---|---|---|---|---|---|
| Carbon fiber | Component [A] | | Carbon fibers 2 | | Carbon fibers 3 | | Carbon fibers 2 | |
| | 1: First resin composition 2: Second resin composition | | 1 | 2 | 1 | 2 | 1 | 2 |
| Epoxy resin | Component [B1] | GAN | 30 | 30 | 30 | 30 | 30 | 30 |
| | Component [B] other than [B1] | "SUMI-EPOXY ®" ELM434 | 70 | 70 | 70 | 70 | 70 | 70 |
| | | "EPICLON ®" HP7200L | | | | | | |
| | | "EPICLON ®" 830 | | | | | | |
| Curing agent | Component [C] | SEIKACURE-S | 51 | 51 | 51 | 51 | — | — |
| | | 3,3'-DAS | — | — | — | — | 51 | 51 |
| Thermoplastic resin particles | Component [D] | Polyamide particles 1 | — | 42 | — | 42 | — | 42 |
| Thermoplastic resin | Other components | "Virantage ®" VW-10700RFP | 17 | 35 | 17 | 35 | 17 | 35 |
| Properties of resin composition | Minimum viscosity (Pa · s) | | 0.2 | — | 0.2 | — | 0.5 | — |
| | G' [20° C., 77 rad/s] (Pa) | | — | $3.5 \times 10^7$ | — | $3.5 \times 10^7$ | — | $3.5 \times 10^7$ |
| | Glass transition temperature (° C.) of cured product | | 195 | | 195 | | 183 | |
| Prepreg properties | Impregnation rate (%) [index of impregnating property] | | 6 | | 2 | | 7 | |
| | Deflection angle (°) [index of drapability] | | 21 | | 8 | | 22 | |
| | Tackiness value (N) [index of tackiness propertyl | | 0.4 | | 0.3 | | 0.3 | |
| | Resin content (mass %) | | 34 | | 34 | | 32 | |
| CFRP properties | Tensile strength translation rate (%) | | 90 | | — | | — | |
| | CAI (MPa) | | 286 | | — | | 191 | |

TABLE 2

| | | | Comparative Example 10 | | Comparative Example 11 | | Comparative Example 12 | |
|---|---|---|---|---|---|---|---|---|
| Carbon fiber | Component [A] | | Carbon fibers 2 | | Carbon fibers 1 | | Carbon fibers 4 | |
| | 1: First resin composition 2: Second resin composition | | 1 | 2 | 1 | 2 | 1 | 2 |
| Epoxy resin | Component [B1] | GAN | | | | | | |
| | Component [B] other than [B1] | "SUMI-EPOXY ®" ELM434 | 50 | 50 | 50 | 50 | 50 | 50 |
| | | "EPICLON ®" HP7200L | 30 | 30 | 30 | 30 | 30 | 30 |
| | | "EPICLON ®" 830 | 20 | 20 | 20 | 20 | 20 | 20 |
| Curing agent | Component [C] | SEIKACURE-S | 42 | 42 | 42 | 42 | 42 | 42 |
| | | 3,3'-DAS | | | | | | |
| Thermoplastic resin particles | Component [D] | Polyamide particles 1 | — | 42 | — | 42 | — | 42 |
| Thermoplastic resin | Other components | "Virantage ®" VW-10700RFP | 12 | 12 | 12 | 12 | 12 | 12 |
| Properties of resin composition | Minimum viscosity (Pa · s) | | 0.2 | | 0.2 | — | 0.2 | — |
| | G' [20° C., 77 rad/s] (Pa) | | | $5.0 \times 10^7$ | — | $5.0 \times 10^7$ | — | $5.0 \times 10^7$ |
| | Glass transition temperature (° C.) of cured product | | 205 | | 205 | | 205 | |
| Prepreg properties | Impregnation rate (%) [index of impregnating property] | | 6 | | 4 | | 5 | |
| | Deflection angle (°) [index of drapability] | | 15 | | 9 | | 12 | |
| | Tackiness value (N) [index of tackiness property] | | 0.2 | | 0.2 | | 0.2 | |
| | Resin content (mass %) | | 34 | | 34 | | 34 | |
| CERP properties | Tensile strength translation rate (%) | | 91 | | 91 | | 91 | |
| | CAI (MPa) | | — | | — | | — | |

TABLE 3-1

| | | | Example 3 | | Example 4 | | Example 5 | | Example 6 | |
|---|---|---|---|---|---|---|---|---|---|---|
| Carbon fiber | Component [A] | | Carbon fibers 1 | | Carbon fibers 1 | | Carbon fibers 1 | | Carbon fibers 1 | |
| 1: First resin composition 2: Second resin | | | 1 | 2 | 1 | 2 | 1 | 2 | 1 | 2 |
| Epoxy resin | Component [B1] | GAN | 25 | 25 | 38 | 38 | 15 | 15 | 35 | 35 |
| | Component [B] other than [B1] | "SUMI-EPOXY ®" ELM434 | 75 | 75 | 62 | 62 | 85 | 85 | 50 | 50 |
| | | "EPICLON ®" 830 | — | — | — | — | — | — | 15 | 15 |
| Curing agent | [Component [C] | SEIKACURE-S | — | — | 50 | 50 | 51 | 51 | 48 | 48 |
| | | 3,3'-DAS | 51 | 51 | — | — | — | — | — | — |
| Thermoplastic resin particles | Component [D] | Polyamide particles 1 | — | 42 | — | 42 | — | 20 | — | 50 |
| Thermoplastic resin | Other components | "Virantage ®" VW-10700RFP | 17 | 35 | 17 | 33 | 17 | 33 | 17 | 37 |
| Properties of resin composition | Minimum viscosity (Pa · s) | | 0.5 | — | 0.2 | — | 0.5 | — | 0.2 | — |
| | G' [20° C., 77 cad/s] (Pa) | | — | $3.7 \times 10^7$ | — | $3.5 \times 10^7$ | — | $2.6 \times 10^7$ | — | $3.6 \times 10^7$ |
| | Glass transition temperature (° C.) of cured product | | 182 | | 191 | | 204 | | 184 | |
| Prepreg properties | Impregnation rate (%) [index of impregnating property] | | 3 | | 2 | | 3 | | 2 | |
| | Deflection angle (°) [index of drapability] | | 13 | | 14 | | 12 | | 15 | |
| | Tackiness value (N) [index of tackiness property] | | 0.3 | | 0.3 | | 0.4 | | 0.3 | |
| CERP properties | Tensile strength translation rate (%) | | 91 | | 94 | | 86 | | 93 | |
| | CAI (MPa) | | 289 | | 292 | | 257 | | 303 | |

TABLE 3-2

| | | | Comparative Example 4 | | Comparative Example 5 | | Comparative Example 6 | |
|---|---|---|---|---|---|---|---|---|
| Carbon fiber | Component [A] | | Carbon fibers 1 | | Carbon fibers 1 | | Carbon fibers 1 | |
| 1: First resin composition 2: Second resin | | | 1 | 2 | 1 | 2 | 1 | 2 |
| Epoxy resin | Component [B1] | GAN | 10 | 10 | 50 | 50 | 70 | 70 |
| | Component [B] other than [B1] | "SUMI-EPOXY ®" ELM434 | 90 | 90 | 50 | 50 | 30 | 30 |
| | | "EPICLON ®" 830 | — | — | — | — | — | — |
| Curing agent | Component [C] | SEIKACURE-S | 51 | 5.1 | 50 | 50 | 50 | 50 |
| | | 3,3'-DAS | — | — | — | — | — | — |
| Thermoplastic resin particles | Component: [D] | Polyamide particles 1 | — | 42 | — | 42 | — | 42 |
| Thermoplastic resin | Other components | "Virantage ®" VW-10700RFP | 17 | 35 | 17 | 39 | 17 | 41 |
| Properties of resin composition | Minimum viscosity (Pa · s) | | 0.4 | — | 0.1 | — | 0.1 | — |
| | G' [20° C., 77 rad/s] (Pa) | | — | $3.9 \times 10^7$ | — | $2.1 \times 10^7$ | — | $2.1 \times 10^7$ |
| | Glass transition temperature (° C.) of cured product | | 201 | | 176 | | 168 | |
| Prepreg properties | Impregnation rate (%) [index of impregnating property] | | 3 | | 2 | | 2 | |
| | Deflection angle (°) [index of drapability] | | 13 | | 15 | | 17 | |
| | Tackiness value (N) [index of tackiness property] | | 0.3 | | 0.4 | | 0.4 | |
| CFRP properties | Tensile strength translation rate (%) | | 81 | | 94 | | 96 | |
| | CAI (MPa) | | — | | — | | — | |

TABLE 4

| | | | Example 7 | | Example 8 | | Comparative Example 7 | |
|---|---|---|---|---|---|---|---|---|
| Carbon fiber | Component [A] | | Carbon fibers 1 | | Carbon fibers 1 | | Carbon fibers 1 | |
| 1: First resin composition 2: Second resin | | | 1 | 2 | 1 | 2 | 1 | 2 |
| Epoxy resin | Component [B1] | "TOREP ®" A-204E | 30 | 30 | — | — | — | — |
| | | GOT | — | — | 30 | 30 | — | — |
| | Component [B] other than [B1] | "SUMI-EPOXY ®" ELM434 | 70 | 70 | 70 | 70 | 70 | 70 |
| | | "EPICLON ®" 830 | — | — | — | — | 30 | 30 |

TABLE 4-continued

| | | | Example 7 | | Example 8 | | Comparative Example 7 | |
|---|---|---|---|---|---|---|---|---|
| Curing agent | Component [C] | SEIKACURE-S | 47 | 47 | 49 | 49 | 47 | 47 |
| Thermoplastic resin particles | Component [D] | Polyamide particles 1 | — | 42 | — | 42 | — | 42 |
| Thermoplastic resin | Other components | "Virantage ®" VW-10700RFP | 15 | 20 | 17 | 35 | 18 | 18 |
| Properties of resin composition | Minimum viscosity | (Pa · s) | 0.2 | — | 0.2 | — | 0.3 | — |
| | G' [20° C., 77 rad/s] (Pa) | | | $3.7 \times 10^7$ | | $3.6 \times 10^7$ | — | $3.4 \times 10^7$ |
| | Glass transition temperature (° C.) of cured product | | 194 | | 193 | | 197 | |
| Prepreg properties | Impregnation rate (%) [index of impregnating property] | | 2 | | 2 | | 2 | |
| | Deflection angle (°) [index of drapability] | | 15 | | 17 | | 16 | |
| | Tackiness value (N) [index of tackiness property] | | 0.3 | | 0.3 | | 0.3 | |
| CERP properties | Tensile strength translation rate (%) | | 92 | | 90 | | 83 | |

TABLE 5

| | | | Example 10 | | Example 11 | | Example 12 | | Example 13 | |
|---|---|---|---|---|---|---|---|---|---|---|
| Carbon fiber | Component [A] | | Carbon fibers 1 | | Carbon fibers 1 | | Carbon fibers 1 | | Carbon fibars 1 | |
| 1: First resin composition 2: Second resin composition | | | 1 | 2 | 1 | 2 | 1 | 2 | 1 | 2 |
| Epoxy resin | Component: [B1] | GAN | 30 | 30 | 20 | 20 | 25 | 25 | 25 | 25 |
| | Component [B] other than [B1] | "SUMI-EPOXY ®" ELM434 | 70 | 70 | 80 | 80 | 50 | 50 | 50 | 50 |
| | | "Araldite" MY0510 | — | — | — | — | 25 | 25 | 25 | 25 |
| Curing agent | Component [C] | SEIKACURE-S | 51 | 51 | 51 | 51 | 54 | 54 | 54 | 54 |
| Thermoplastic resin particles | Component [D] | Polyamide particles 1 | — | 42 | — | 40 | — | 40 | — | 40 |
| Thermoplastic resin | Other components | "Virantage ®" VW-10700RFP (Weight average molecular weight: 21,000 g/mol) | 11 | 42 | — | — | 17 | 28 | 11 | — |
| | | "Virantage ®" VW-10200RFP (Weight average molecular weight: 46,500 g/mol) | — | — | 17 | 30 | — | — | — | 30 |
| Properties of resin composition | Minimum viscosity (Pa · s) | | 0.1 | — | 0.7 | — | 0.2 | — | 0.1 | — |
| | G' [20° C., 77 rad/s] (Pa) | | — | $1.1 \times 10^8$ | — | $5.2 \times 10^7$ | — | $11.5 \times 10^7$ | — | $5.1 \times 10^7$ |
| | Glass transition temperature (° C.) of cured product | | 194 | | 199 | | 198 | | 198 | |
| Prepreg properties | Impregnation rate (%) [index of impregnating property] | | 1 | | 5 | | 2 | | 1 | |
| | Deflection angle (°) [index of drapability] | | 1.5 | | 13 | | 14 | | 16 | |
| | Tackiness value (N) [index of tackiness property] | | 0.1 | | 0.2 | | 0.5 | | 0.2 | |
| CFRP properties | Tensile strength translation rate (%) | | 92 | | 88 | | 91 | | 90 | |
| | CAI (MPa) | | 294 | | — | | — | | 291 | |

TABLE 6

| | | | Example 14 | | Example 15 | | Example 16 | |
|---|---|---|---|---|---|---|---|---|
| Carbon fiber | Component [A] | | Carbon fibers 1 | | Carbon fibers 1 | | Carbon fibers 1 | |
| 1: First resin composition 2: Second resin | | | 1 | 2 | 1 | 2 | 1 | 2 |
| Epoxy resin | Component [B1] | GAN | 30 | 30 | 30 | 30 | 30 | 30 |
| | Component [B] other than [B1] | "SUMI-EPOXY ®" ELM434 | 70 | 70 | 70 | 70 | 70 | 70 |
| Curing agent | Component [C] | SEIKACURE-S | 51 | 51 | 51 | 51 | 54 | 54 |
| Thermoplastic resin particles | Component [D] | Polyamide particles 1 | — | 42 | — | 42 | — | 42 |
| Conductive particles | Carbon particles | "NICABEADS ®" ICB2020 | — | 2 | — | 6 | — | 4 |
| | Carbon black | #3230B | — | — | — | — | 3 | 3 |
| Thermoplastic resin | Other components | "Virantage ®" VW-10700RFP | 17 | 35 | 17 | 35 | 17 | 35 |
| Properties of resin composition | Minimum viscosity (Pa · s) | | 0.2 | — | 0.2 | — | 0.3 | — |
| | G' [20° C., 77 rad/s] (Pa) | | — | $3.5 \times 10^7$ | — | $3.6 \times 10^7$ | — | $3.7 \times 10^7$ |
| | Glass transition temperature (° C.) of cured product | | 198 | | 197 | | 199 | |

TABLE 6-continued

| | | Example 14 | Example 15 | Example 16 |
|---|---|---|---|---|
| Prepreg properties | Impregnation rate (%) [index of impregnating property] | 2 | 2 | 2 |
| | Deflection angle (°) [index of drapability] | 15 | 15 | 15 |
| | Tackiness valve (N) [index of tackiness property] | 0.2 | 0.2 | 0.2 |
| CFRP properties | CAI (MPa) | 286 | 280 | 284 |

The invention claimed is:

1. A prepreg comprising at least the following components [A] to [D], wherein the prepreg includes:

a first layer in which the component [A] is impregnated with a first resin composition containing the components [B] and [C]; and a second layer that contains a second resin composition containing the components [B] to [D] and is formed on both surfaces of the first layer, and the first layer and the second layer are adjacent to each other, wherein an average fiber diameter of a carbon fiber as the component [A] is 6 μm or more and 9 μm or less, wherein a content of a bifunctional amine type epoxy resin [B1] is 15 parts by mass or more and less than 40 parts by mass based on 100 parts by mass of a total amount of epoxy resin of the component [B], and wherein a storage modulus G' of the second resin composition measured at 20° C. and 77 rad/s is $2.0 \times 10^7$ Pa or more:

[A] a carbon fiber

[B] an epoxy resin

[C] a curing agent

[D] thermoplastic resin particles.

2. The prepreg according to claim 1, wherein the average fiber diameter of the carbon fiber of the component [A] is 7 μm or more.

3. The prepreg according to claim 1, wherein a minimum viscosity of the first resin composition is 0.1 Pa·s or more and 1.0 Pa·s or less.

4. The prepreg according to claim 1, wherein a deflection angle of the prepreg is in a range of 10° or more and 17° or less, and the deflection angle of the prepreg is determined by fixing one end of the prepreg cut into a width of 12.7 mm and a length of 400 mm to a horizontal desk, leaving the prepreg in a state in which the prepreg protrudes from an end of the horizontal desk by 200 mm, and measuring a deflection angle of the prepreg after 10 minutes.

5. The prepreg according to claim 1, wherein a coefficient of variation of an average distance between carbon fibers in the first layer of a carbon fiber reinforced composite material (CFRP) obtained by curing the prepreg is 16% or more and less than 50%.

6. The prepreg according to claim 1, wherein a glass transition temperature of a cured resin obtained by only blending the components [B] and [C], among components constituting the first resin composition and the second resin composition, to prepare a resin composition for measuring a glass transition temperature, and curing the epoxy resin composition for measuring a glass transition temperature at a temperature of 180° C. for 2 hours is 180° C. or higher.

7. The prepreg according to claim 1, wherein a mass of carbon fibers per unit area of the carbon fiber of the component [A] is 250 g/m$^2$ or more.

8. The prepreg according to claim 1, wherein conductive particles as a component [E] are contained in an amount of 1 part by mass or more based on 100 parts by mass of a total amount of epoxy resin of the component [B].

9. The prepreg according to claim 1, wherein in the first resin composition, a blending amount of a thermoplastic resin that is soluble in the epoxy resin [B] is in a range of 6 parts by mass or more and 12 parts by mass or less based on 100 parts by mass of the total amount of the first resin composition.

10. The prepreg according to claim 1, wherein the first resin composition further comprises a thermoplastic resin soluble in the epoxy resin, and the blending amount of the thermoplastic resin soluble in the epoxy resin is in a range of 6.5 parts by mass or more and 16 parts by mass or less based on 100 parts by mass of the total amount of the first resin composition.

* * * * *